(12) United States Patent
Iwanami et al.

(10) Patent No.: US 10,474,842 B2
(45) Date of Patent: Nov. 12, 2019

(54) INFORMATION PROCESSING SYSTEM, STORAGE MEDIUM, AND CONTROL METHOD

(71) Applicant: SONY CORPORATION, Tokyo (JP)

(72) Inventors: Hiroshi Iwanami, Tokyo (JP); Masamichi Asukai, Kanagawa (JP)

(73) Assignee: SONY CORPORATION, Tokyo (JP)

(*) Notice: Subject to any disclaimer, the term of this patent is extended or adjusted under 35 U.S.C. 154(b) by 100 days.

(21) Appl. No.: 15/521,615

(22) PCT Filed: Aug. 4, 2015

(86) PCT No.: PCT/JP2015/072054
§ 371 (c)(1),
(2) Date: Apr. 24, 2017

(87) PCT Pub. No.: WO2016/072118
PCT Pub. Date: May 12, 2016

(65) Prior Publication Data
US 2017/0235975 A1 Aug. 17, 2017

(30) Foreign Application Priority Data
Nov. 7, 2014 (JP) ................. 2014-227006

(51) Int. Cl.
H04L 29/06 (2006.01)
G06F 21/64 (2013.01)
(Continued)

(52) U.S. Cl.
CPC .......... *G06F 21/64* (2013.01); *G06F 21/6245* (2013.01); *H04L 63/0421* (2013.01);
(Continued)

(58) Field of Classification Search
CPC ....................................................... G06F 21/64
See application file for complete search history.

(56) References Cited

U.S. PATENT DOCUMENTS 6,674,458 B1 * 1/2004 Cohen-Solal .......... H04N 7/147
348/14.01
7,564,476 B1 * 7/2009 Coughlan .............. H04N 7/147
348/14.01
(Continued)

FOREIGN PATENT DOCUMENTS

JP 2006-093775 A 4/2006
JP 2006-140747 A 6/2006
(Continued)

OTHER PUBLICATIONS

Office Action for JP Patent Application No. 2016-557470, dated Apr. 16, 2019, 06 pages of Office Action and 06 pages of English Translation.

*Primary Examiner* — Harris C Wang
(74) *Attorney, Agent, or Firm* — Chip Law Group

(57) ABSTRACT

The present disclosure relates to an information processing system, a storage medium and a control method through which a user privacy level in a telepresence system can be set depending on a counterpart. The information processing system includes a setting unit that automatically sets a privacy level depending on a user of a communication destination device; a communication unit that transmits a picture of a user of a communication source device to the communication destination device; and a controller that performs control to mask the picture of the user of the communication source device depending on the automatically set privacy level.

14 Claims, 15 Drawing Sheets

(51) Int. Cl.
*H04N 5/262* (2006.01)
*H04N 7/14* (2006.01)
*H04W 12/02* (2009.01)
*G06F 21/62* (2013.01)
*H04N 21/431* (2011.01)
*H04N 21/4788* (2011.01)
*H04N 21/442* (2011.01)

(52) U.S. Cl.
CPC ............... *H04N 5/262* (2013.01); *H04N 7/14* (2013.01); *H04N 7/147* (2013.01); *H04W 12/02* (2013.01); *G06F 2221/2137* (2013.01); *G06F 2221/2141* (2013.01); *G06F 2221/2149* (2013.01); *H04N 21/431* (2013.01); *H04N 21/44218* (2013.01); *H04N 21/4788* (2013.01)

(56) References Cited

U.S. PATENT DOCUMENTS

| | | | |
|---|---|---|---|
| 8,514,281 B2* | 8/2013 | Kogane | G08B 13/19686 348/143 |
| 9,317,713 B2* | 4/2016 | Wong | G06F 21/6245 |
| 9,779,474 B2* | 10/2017 | Kominar | G06T 3/0093 |
| 9,965,648 B1* | 5/2018 | Cheng | G06F 21/6245 |
| 10,311,249 B2* | 6/2019 | Sharifi | G06F 21/6245 |
| 2003/0231769 A1* | 12/2003 | Bolle | G06T 1/0021 380/210 |
| 2007/0116356 A1* | 5/2007 | Gong | G06K 9/38 382/173 |
| 2007/0201694 A1* | 8/2007 | Bolle | G06T 1/0021 380/205 |
| 2008/0297586 A1 | 12/2008 | Kurtz et al. | |
| 2010/0238262 A1* | 9/2010 | Kurtz | H04N 7/142 348/14.01 |
| 2011/0242345 A1* | 10/2011 | O'Gorman | G06F 21/6263 348/222.1 |
| 2012/0026274 A1 | 2/2012 | Baker et al. | |
| 2012/0311032 A1* | 12/2012 | Murphy | G07F 17/3225 709/204 |
| 2012/0327177 A1* | 12/2012 | Kee | H04N 7/15 348/14.08 |
| 2014/0139609 A1* | 5/2014 | Lu | H04N 7/15 348/14.03 |
| 2014/0176663 A1* | 6/2014 | Cutler | G06T 7/50 348/14.07 |
| 2014/0362163 A1* | 12/2014 | Winterstein | H04N 7/15 348/14.07 |
| 2015/0143459 A1* | 5/2015 | Molnar | G06F 21/629 726/2 |
| 2015/0332066 A1* | 11/2015 | Prakash | G06F 21/6245 726/27 |
| 2016/0035135 A1* | 2/2016 | Park | G06T 19/006 345/633 |
| 2016/0150188 A1* | 5/2016 | Ha | G06T 7/20 348/143 |
| 2017/0109544 A1* | 4/2017 | Chen | G06F 21/6254 |
| 2017/0157514 A1* | 6/2017 | Nakano | H04N 7/144 |
| 2017/0235975 A1* | 8/2017 | Iwanami | G06F 21/64 726/28 |
| 2018/0068126 A1* | 3/2018 | Biswas | G06F 21/6245 |

FOREIGN PATENT DOCUMENTS

| | | |
|---|---|---|
| JP | 2011-172205 A | 9/2011 |
| JP | 2012-120105 A | 6/2012 |
| JP | 2012-175528 A | 9/2012 |
| JP | 2013-504933 A | 2/2013 |

* cited by examiner

FIG.7

| OBJECT ID | DATE AND TIME AND PERIOD | RELATED OBJECT ID | INTERACTION | DETAILS | EVALUATION (-1.0 ~ 1.0) |
|---|---|---|---|---|---|
| 5505 (USER B) | 2010/10/02 19:00~21:32 | 15850002 (TV) | WATCH | ENTHUSIASTICALLY | 0.8 |
| 15850002 | 2010/10/02 19:00~21:32 | 5505 | WATCHED | FREQUENTLY CHANGE CHANNELS | 0.1 |
| 5505 | 2010/10/02 20:12 | 15850002 | THROW OBJECT | DUE TO EXCITATION FROM PROGRAM | -0.1 |
| 15850002 | 2010/10/02 20:12 | 5505 | OBJECT IS THROWN | DAMAGED BY HITTING | -0.8 |
| 5505 | 2011/02/03 23:12~23:44 | 6532 (USER A) | MAKE PHONE CALL | LOOK UPSET | -0.1 |
| 5505 | 2011/02/03 23:12~23:44 | 17830003 (TELEPHONE #1) | MAKE PHONE CALL | IN LOUD VOICE | 0.1 |
| 17830003 | 2011/02/03 23:12~23:44 | 5505 | MAKE PHONE CALL | WHILE FREQUENTLY PULLING CABLE OF RECEIVER OF TELEPHONE | -0.5 |
| ... | | | | | |

FIG.8

| OBJECT ID | DATE AND TIME AND PERIOD | RELATED OBJECT ID | INTERACTION | INTERACTION | EVALUATION (-1.0 ~ 1.0) |
|---|---|---|---|---|---|
| 15850002 | 2010/10/02 19:00~21:32 | 5505 | WATCHED | FREQUENTLY CHANGE CHANNELS | 0.1 |
| 15850002 | 2010/10/02 20:12 | 5505 | OBJECT IS THROWN | DAMAGED BY HITTING | -0.8 |
| 17830003 | 2011/02/03 23:12~23:44 | 5505 | MAKE PHONE CALL | WHILE FREQUENTLY PULLING CABLE OF RECEIVER OF TELEPHONE | -0.5 |

INFORMATION PROCESSING SYSTEM, STORAGE MEDIUM, AND CONTROL METHOD

CROSS REFERENCE TO RELATED APPLICATIONS

This application is a U.S. National Phase of International Patent Application No. PCT/JP2015/072054 filed on Aug. 4, 2015, which claims priority benefit of Japanese Patent Application No. JP 2014-227006 filed in the Japan Patent Office on Nov. 7, 2014. Each of the above-referenced applications is hereby incorporated herein by reference in its entirety.

TECHNICAL FIELD

The present disclosure relates to an information processing system, a storage medium, and a control method.

BACKGROUND ART

As shown by the recent expansion of social networks, people are demanding more interpersonal connection and close communication. Further, there are cases in which people cannot live with their parents and family members because of their home and work situations. In such cases, people want to know how their parents and family members with whom they do not live are.

For such situations, display devices, high-definition cameras and the like that can display realistic clear pictures have been developed according to recent technological development and a telepresence system that connects remote spaces using such devices has been proposed.

For example, Patent Literature 1 below proposes a picture information processing device that sets a permitted event for determining whether a picture obtained by photographing a real space in which a first user is present can be presented to a second user and transmits information indicating the set permitted event to a counterpart.

CITATION LIST

Patent Literature

Patent Literature 1: JP 2011-172205A

DISCLOSURE OF INVENTION

Technical Problem

Although clear pictures and sounds of spaces of both sides are provided and thus interpersonal connection and close communication can be realized in the aforementioned recent telepresence system, there is no excellent means for controlling privacy. For example, when remotely located rooms are connected, although captured images obtained by photographing a room are continuously displayed through a display device of a room of a communication destination, there is a need for a means for protecting user privacy in a case in which an object that a user does not want to show is photographed or there is a time slot in which the user does not want to share.

In previous telepresence systems, users turn telepresence communication on and off using a mute button, a cover covering a camera or the like as a privacy control means.

In the case of previous privacy control means, however, automatic control of a privacy level of a telepresence system has not been mentioned. Here, since a privacy level of a user depends on the relationship between the user and a counterpart and what kind of person the counterpart is, a telepresence system having a high degree of convenience can be provided by setting the user privacy level depending on the counterpart.

Accordingly, the present disclosure proposes an information processing system, a storage medium and a control method through which a user privacy level in a telepresence system can be set depending on a counterpart.

Solution to Problem

According to the present disclosure, there is proposed an information processing system including: a setting unit that automatically sets a privacy level depending on a user of a communication destination device; a communication unit that transmits a picture of a user of a communication source device to the communication destination device; and a controller that performs control to mask the picture of the user of the communication source device depending on the automatically set privacy level.

According to the present disclosure, there is proposed a storage medium having a program stored therein, the program causing a computer to function as: a setting unit that automatically sets a privacy level depending on a counterpart user of a communication destination device; a communication unit that transmits a picture of a user to the communication destination device; and a controller that performs control to mask the picture of the user depending on the automatically set privacy level.

According to the present disclosure, there is provided a control method including: automatically setting a privacy level depending on a user of a communication destination device; transmitting a picture of a user of a communication source device to the communication destination device; and performing control to mask the picture of the user of the communication source device depending on the automatically set privacy level.

Advantageous Effects of Invention

According to the present disclosure described above, it is possible to set a user privacy level in a telepresence system depending on a counterpart.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 7 is an illustration of an example of interaction evaluation data according to the present embodiment.

FIG. 8 is an illustration of an example of data extracted from the example of interaction evaluation data illustrated in FIG. 7 and used for emotion value calculation.

MODE(S) FOR CARRYING OUT THE INVENTION

Figure 1:
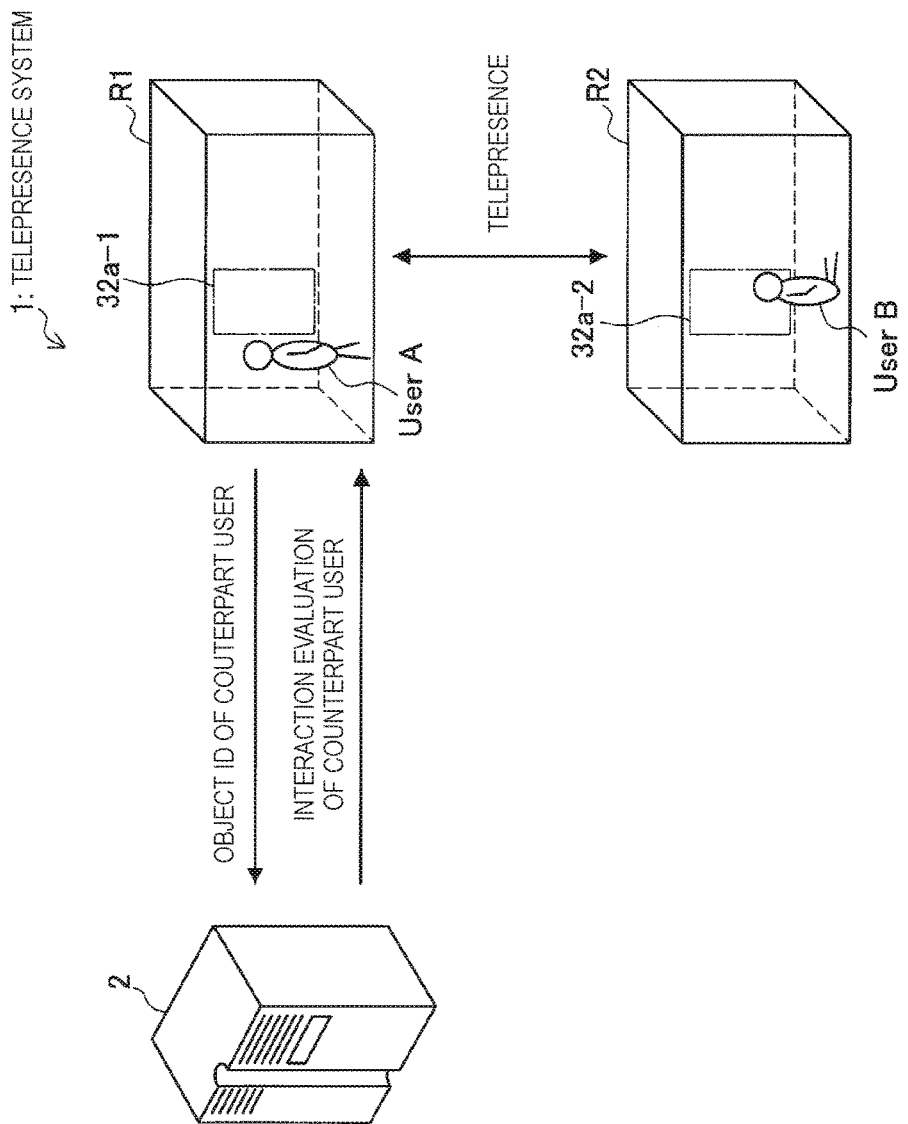
FIG. 1 is an explanatory diagram of an overview of a telepresence system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Description will be given in the following order.
1. Overview of telepresence system according to embodiment of present disclosure
2. Basic configuration
2-1. Configuration of communication control device
2-2. Configuration of emotion server
3. Operation processes
3-1. Telepresence control
3-2. Control of setting of opening degree
4. Supplement
4-1. Display of message and the like
4-2. Use of physical shoji
5. Conclusion

1. OVERVIEW OF TELEPRESENCE SYSTEM ACCORDING TO EMBODIMENT OF PRESENT DISCLOSURE

First of all, an overview of a telepresence system 1 according to an embodiment of present disclosure will be described with reference to FIG. 1. As illustrated in FIG. 1, the telepresence system 1 according to the present embodiment can connect a plurality of spaces (e.g., rooms R1 and R2) and provide a picture of one space to the other space to achieve communication between users in remote spaces. Specifically, the telepresence system 1 acquires a state of a user A in the room R1 with a high-definition camera and a microphone array installed in the room R1 and outputs the acquired state through a display part 32a-2 and a speaker installed in the room R2. Similarly, the telepresence system 1 acquires a state of a user B in the room R2 with a high-definition camera and a microphone array installed in the room R2 and outputs the acquired state through a display part 32a-1 and a speaker installed in the room R1.

In this way, states of both sides are photographed with high-definition cameras and provided to counterparts and thus even remotely located users can perform more realistic and close communication. However, a means for controlling user privacy is needed.

While telepresence communication is turned on and off according to determination of a user using a mute button, a cover covering a camera or the like in previous telepresence systems, such a control means unilaterally cuts communication of pictures and sounds and thus the intention of a cutting side is not delivered to a cut side. Further, an excellent means for controlling a privacy level indicating that a user may allow part of a room to be shown to a counterpart although he or she does not want to show the whole of a picture of a room has not been provided. In addition, while a privacy level of a user depends on the relationship between the user and a counterpart and what kind of person the counterpart is, setting the privacy level depending on the counterpart has not been considered in previous telepresence systems.

Accordingly, the present embodiment can appropriately maintain privacy by automatically setting a privacy level in the telepresence system depending on a counterpart. Specifically, it is possible to cope with a user demand for not wanting to show part of a picture of a room without turning off and unilaterally shutting communication by masking pictures provided to a counterpart depending on a set privacy level.

Setting of a privacy level depending on a counterpart according to the present embodiment may be performed, for example, depending on attribute information, behavior information, emotion information or environment information of the counterpart. Further, the privacy level may be set using a predetermined index indicating personality or trust of the counterpart in the present embodiment. The predetermined index is an emotion value calculated on the basis of evaluation history of interactions (behaviors) performed by a target person for other persons and objects.

Specifically, when a privacy level of the user A with respect to the user B illustrated in FIG. 1 is set, for example, the telepresence system 1 acquires interaction evaluation of the user B from the emotion server 2 on the basis of the object ID of the user B. Then, the telepresence system 1 calculates an emotion value of the user B on the basis of the acquired interaction evaluation and sets the privacy level depending on the calculated emotion value. If the emotion value is high, it can be said that the user B is a highly trusted person and thus the telepresence system 1 lowers the privacy level of the user A and extends the area of the picture open to the user B. On the other hand, if the emotion value is low, it can be said that the user B is not a highly trusted person and thus the telepresence system 1 increases the privacy level of the user A and controls the area of the picture open to the user B to decrease or controls communication to be off.

Control of the area of the picture (captured image of the user A) open to the counterpart depending on the set privacy level is realized by masking the picture using a predetermined means. For example, the picture masking means may superimpose an image on the open picture (captured image of the user A) to hide at least part of the open picture to appropriately maintain privacy of the user A. A shoji image, for example, is used as the superimposed image. A shoji is one of fittings used for doors and windows in houses, and Japanese paper is attached to a wooden frame thereof such that light passes therethrough. Accordingly, the shoji can transmit light even when closed. Further, the shoji is a device that expresses the intention of a person who manipulates it because the shoji is opened and closed according to horizontal movement. That is, in the case of doors and windows which turn on hinges, stopping between an open state and a closed state is unstable. In the case of the shoji, however, even stopping in a slightly open state is not unstable and expresses the intention (to open to a certain degree) of a person who manipulates the door. In the present embodiment, such functions of the shoji are realized by the shoji image and thus privacy of the user A can be appropriately maintained by hiding part of the open picture. Furthermore, the user B can intuitively recognize a degree to which the user A is willing to share according to a degree of the open picture hidden by the shoji image (an opening degree of a virtual shoji, that is, opening degree).

When the shoji image is used, the privacy level is set as an opening degree of the shoji. That is, the opening degree increases when the privacy level decreases and the opening degree decreases when the privacy level increases.

In addition, the opening degree of the shoji (privacy level) may be shared by a communication source and a communication destination. In this case, the position (opening degree of a virtual shoji) at which the shoji image is superimposed on the captured image of the user B in the room R2 in the display part 32a-1 of the room R1 where the user A is is the same as the position (opening degree of the virtual shoji) at which the shoji image is superimposed on the captured image of the user A in the room R1 in the display part 32a-2 of the room R2 where the user B is. Accordingly, the user A can intuitively recognize to what degree his or her privacy level is set by viewing the opening degree of the shoji displayed on the display part 32a-1. Hereinafter, an example of display of the shoji image will be described with reference to FIG. 2.

Figure 2:
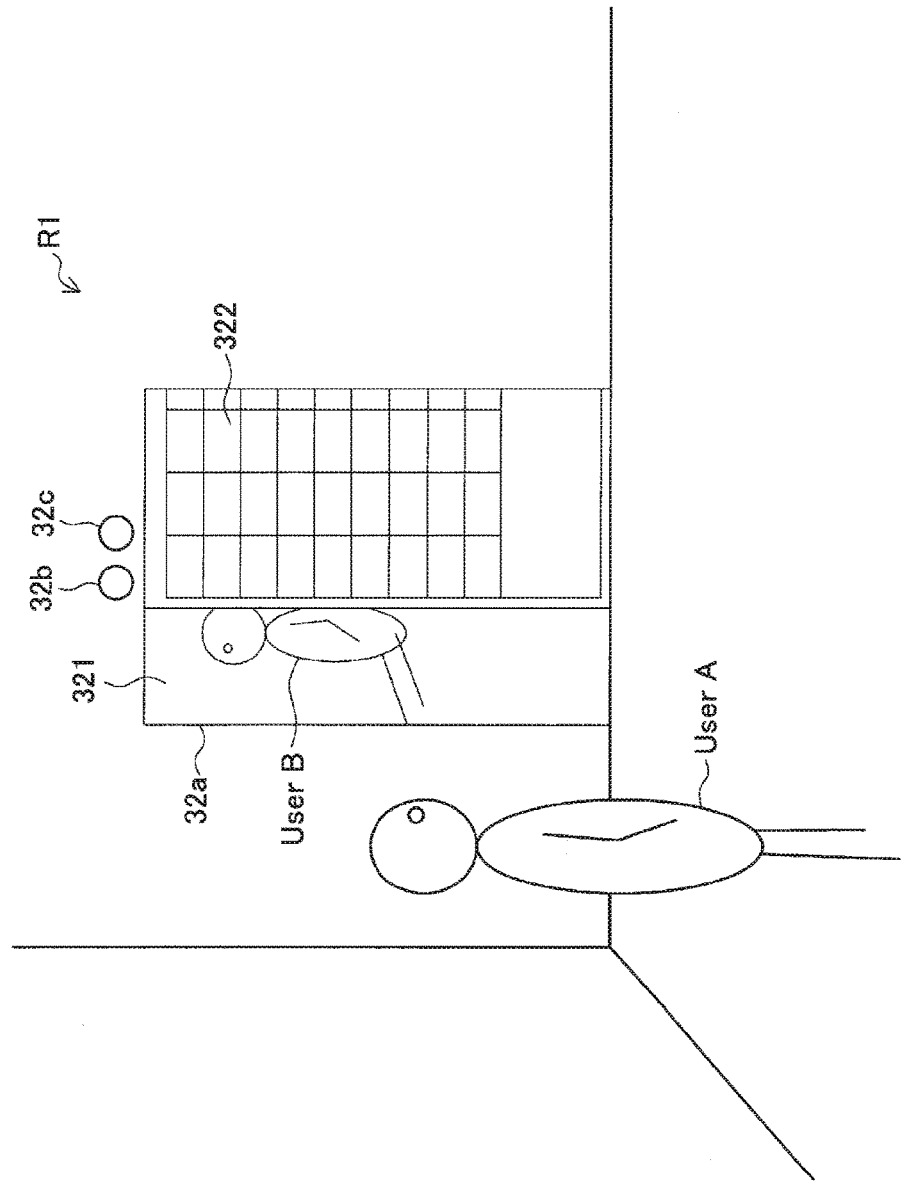
FIG. 2 is an explanatory diagram of an example of display of a shoji image according to the present embodiment.

FIG. 2 is an explanatory diagram of an example of display of the shoji image according to the present embodiment. As illustrated in FIG. 2, a display part 32a, a camera 32b and a microphone array 32c are provided on the surface of a wall in the room R1 where the user A is. The display part 32a is arranged such that the lower end thereof which is also the surface of a wall of the room R2 is close to the floor to realize presence and experience as if the shoji were actually provided on the wall of the room R1 and the remote room R2 were nearby when a captured image 321 of the room R2 and a shoji image 322 are displayed on the display part 32a. Further, the camera 32b and the microphone array 32c are provided above the display part 32a in FIG. 2. Arrangement of the display part 32a, camera 32b and microphone array 32c illustrated in FIG. 2 is an example and the present embodiment is not limited thereto.

Information (captured images and sounds) of the user A acquired using the camera 32b and the microphone array 32c installed in the room R1 is transmitted to the room R2 through a communication control device (not shown) of the room R1. In addition, information (the captured image 321 and sounds) of the user B acquired using a camera and a microphone array installed in the room R2 is transmitted to the room R1 through a communication control device (not shown) of the room R2.

The communication control device of the room R1 performs control to display the captured image 321 transmitted from the room R2 and the shoji image 322 for masking the captured image 321 on the display part 32a, as illustrated in FIG. 2. The shoji image 322 is superimposed on the captured image 321 and an opening degree thereof is adjusted depending on the privacy level. For example, the opening degree increases in order to extend the open area of the picture when the privacy level is set to be lower, whereas the opening degree is controlled to decrease in order to narrow the open area of the picture when the privacy level is set to be higher. Meanwhile, the set privacy level is shared by the side of the user A (room R1) and the side of the user B (room R2) in the present embodiment. In addition, an area of the captured image 321 of the communication destination that can be viewed without being masked, is varied depending on the opening degree of the shoji image 322, and the volume of sounds of the communication destination may be adjusted depending on the opening degree of the shoji image 322.

By controlling the privacy level in the telepresence system 1 according to the present embodiment with an opening degree of a virtual shoji using the shoji image 322, adjustment of opening part of an image can be performed without turning communication on and off by a previous privacy control means. Further, although the intention of one side is unilaterally reflected in turning communication on and off and thus is not delivered to the other side in previous systems, an open area can be adjusted from minimum to maximum and thus a user's intention about an opening degree of images is delivered to a counterpart in the present embodiment.

Meanwhile, paper (Japanese paper attached to a wooden frame) of an actual shoji has an optical transmittance of 40% to 50% which falls between a transparent material such as glass and a shielding material such as walls and thus light and sounds from the other side of the shoji can slightly pass therethrough to appropriately maintain privacy while indicating presence of a person or an object at the other side. Accordingly, in the present embodiment, it is possible to deliver presence of a counterpart while closing the shoji to maintain privacy by image-processing the shoji image 322 such that the shoji is transparent. Further, since a watermark pattern may be added to the paper of the actual shoji and a beautiful pattern can be exposed by being irradiated with light, the telepresence system 1 may control the watermark pattern to be seen when transparent image processing is performed.

The overview of the telepresence system 1 according to the present embodiment has been described above. Although the shoji image 322 is used as an example of a privacy control means in the example illustrated in FIG. 2, the present embodiment is not limited thereto and, for example, images of a curtain, a roll curtain, a misu, a blind, frosted glass, a liquid crystal shutter and the like may be used in the same manner. When the privacy control means is a curtain image, a roll curtain image, a misu image or a blind image, the privacy level is set as the opening degree thereof. When the privacy control means is a frosted glass image or a liquid crystal shutter image, the privacy level is set as the transmittance thereof.

In addition, data transmission and reception of the room R1 are controlled by a first communication control device (not shown) and data transmission and reception of the room R2 are controlled by a second communication control device (not shown) in the telepresence system 1 described above. The first and second communication control devices are connected through a network and transmit/receive data to/from each other. Specifically, the first communication control device transmits information (captured images and sounds) of the user A acquired using the camera 32b and the microphone array 32c of the room R1 to the second communication control device, and the second communication control device controls the received captured images and sounds to be output through the display part and a speaker of the room R2. Similarly, the second communication control device transmits information (captured images and sounds) of the user B acquired using the camera and the microphone array of the room R2 to the first communication control device, and the first communication control device controls the received captured images and sounds to be output through the display part 32a and a speaker of the room R1.

2. BASIC CONFIGURATION

Next, a detailed configuration of each device included in the telepresence system 1 will be described with reference to FIGS. 3 and 4.

<2-1. Configuration of Communication Control Device>

Figure 3:
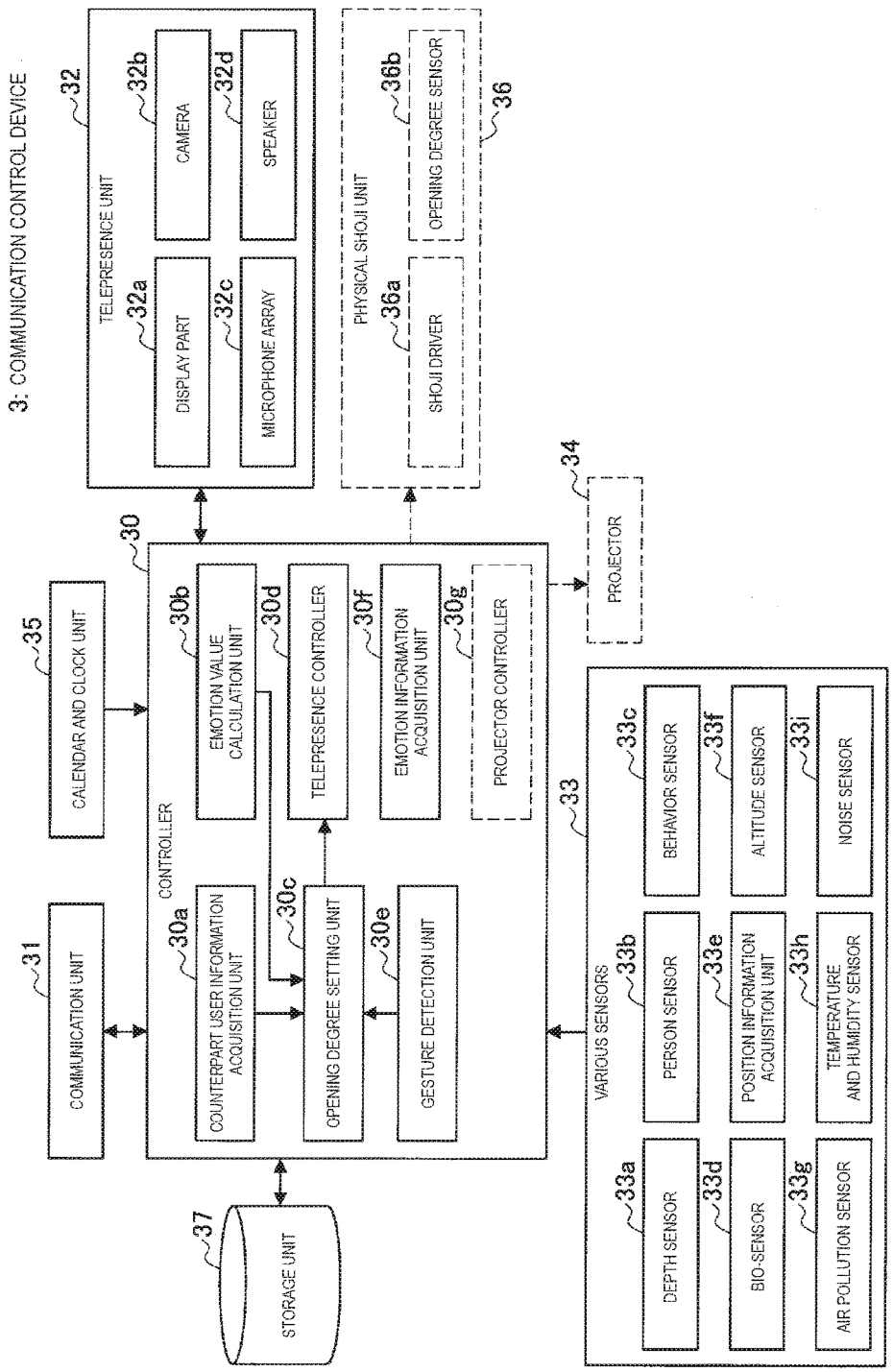
FIG. 3 is a block diagram illustrating an example of a configuration of a communication control device according to the present embodiment.

FIG. 3 is a block diagram illustrating an example of a configuration of a communication control device 3 according to the present embodiment. The communication control device 3 controls transmission and reception of data in spaces connected through the telepresence system 1.

As illustrated in FIG. 3, the communication control device 3 according to the present embodiment includes a controller 30, a communication unit 31, a telepresence unit 32, various sensors 33, a calendar and clock unit 35 and a storage unit 37.

(2-1-1. Controller)

The controller 30 controls components of the communication control device 3. The controller 30 is realized by a micro-computer including a central processing unit (CPU), a read only memory (ROM), a random access memory (RAM) and a nonvolatile memory. Specifically, the controller 30 functions as a counterpart user information acquisition unit 30a, an emotion value calculation unit 30b, an opening degree setting unit 30c, a telepresence controller 30d, a gesture detection unit 30e and an emotion information acquisition unit 30f, as illustrated in FIG. 3. Further, when the communication control device 3 includes a projector 34, the controller 30 functions as a projector controller 30g.

The counterpart user information acquisition unit 30a acquires information about a counterpart user of a communication destination. Specifically, the counterpart user information acquisition unit 30a acquires attribute information, behavior information, emotion information or environment information of the counterpart user from a communication control device of the communication destination or a specific server. Specifically, the attribute information is information such as a sex, age, height, weight, blood type, disposition or hobby and tastes, for example. The behavior information is information indicating a behavior currently performed by the counterpart user and, specifically, the position of the counterpart user in a space, moving speed, motion type, motion speed, motion tempo, involuntary behavior, time series information of shoji manipulation and the like, for example. The emotion information is information indicating the present emotion of the counterpart user. The environment information is information indicating weather, temperature, humidity, a noise level, room illumination and an air pollution level of the space where the counterpart unit is, a date and time, a geographical position of the space, altitude, a building state or the like. The counterpart user information acquisition unit 30a outputs the acquired information of the counterpart user to the opening degree setting unit 30c.

The emotion value calculation unit 30b acquires interaction evaluation correlated to the counterpart user from the emotion server 2 on the basis of an object ID of the counterpart user and calculates an emotion value of the counterpart user. The object ID of the counterpart user may be acquired through the counterpart user information acquisition unit 30a or through inquiry of a specific server or previously registered in the storage unit 37. The emotion value calculation unit 30b outputs the calculated emotion value of the counterpart user to the opening degree setting unit 30c.

The opening degree setting unit 30c sets a privacy level depending on the counterpart user as an opening degree. Specifically, the opening degree setting unit 30c sets a lower privacy level, that is, a higher opening degree of a virtual shoji when the counterpart user is more trusted on the basis of at least one of the attribute information, behavior information, emotion information and environment information of the counterpart user acquired by the counterpart user information acquisition unit 30a, and the emotion value of the counterpart user calculated by the emotion value calculation unit 30b. Further, the opening degree setting unit 30c sets a higher privacy level, that is, a lower opening degree of the virtual shoji when the counterpart user is less trusted. The opening degree setting unit 30c outputs the set opening degree to the telepresence controller 30d.

Although a standard of determination of whether the counterpart user is trusted or not is not particularly limited, trust may be increased when attribute information of the counterpart user is identical or similar to that of the user, for example. Specifically, when the counterpart user has the same sex, age, hobby, taste, disposition and the like as the user, the opening degree setting unit 30c determines that trust is high and sets a low privacy level, that is, a high opening degree of the virtual shoji. Otherwise, the opening degree setting unit 30c determines that the counterpart user is not a highly trusted person and sets a high privacy level, that is, a low opening degree of the virtual shoji when the behavior information of the counterpart user includes a predetermined behavior (e.g., a dangerous behavior of throwing an object or the like) or the emotion information of the counterpart user includes a predetermined emotion (e.g., an emotion such as anger, hatred, fear or the like), for example. Further, when the environment information of the counterpart user includes a predetermined environment (e.g., noise or the like) or the behavior information includes a predetermined behavior (e.g., enthusiastically watching TV or the like), the opening degree setting unit 30c may sets a low opening degree of the virtual shoji because the environment is not suitable for a situation in which telepresence is performed. Further, when the emotion value of the counterpart user exceeds a predetermined value, the opening degree setting unit 30c may determine that the counterpart user is a highly trusted person and set a low privacy level, that is, a high opening degree of the virtual shoji.

The telepresence controller 30d controls the telepresence unit 32 and realizes telepresence between a target space and a communication destination space. Specifically, the telepresence controller 30d controls captured images photographed by the camera 32b of the telepresence unit 32 and sounds collected by the microphone array 32c to be transmitted from the communication unit 31 to the communication control device of the communication destination. Here, the telepresence controller 30d controls the captured image to be masked depending on the opening degree set by the opening degree setting unit 30c. Specifically, the telepresence controller 30d may perform processing of superimposing the shoji image on the captured image depending on the set opening degree and transmit the processed image to the communication destination or transmit the set opening degree with the captured image to the communication destination.

In addition, the telepresence controller 30d controls the captured image 321 received from the communication control device of the communication destination to be displayed on the display part 32a and controls received sounds to be reproduced through a speaker 32d in the same manner. When the privacy level is shared with the communication destination, the telepresence controller 30d adjusts the position of the displayed shoji image 322 is superimposed on the captured image 321 depending on the opening degree set by the opening degree setting unit 30c.

The gesture detection unit 30e detects a user's gesture on the basis of depth information acquired by a depth sensor 33a included in the various sensors 33. For example, the gesture detection unit 30e detects a gesture of opening the shoji. Although the privacy level is set depending on the counterpart user in the present embodiment, as described above, the user may arbitrarily change the privacy level. Specifically, when the user makes a gesture of opening/closing the shoji with respect to the shoji image 322 displayed on the display part 32a, the gesture is sensed by the depth sensor 33a. When the gesture detection unit 30e detects the gesture of opening/closing the shoji on the basis of depth information acquired by the depth sensor 33a, the opening degree setting unit 30c changes the opening degree of the shoji image 322 depending on the detected gesture. In addition, when the privacy level (opening degree of the virtual shoji) is shared, the telepresence controller 30d transmits the opening degree changed by the opening degree setting unit 30c to the communication control device of the communication destination and, simultaneously, changes the superimposition position of the shoji image 322 displayed on the display part 32a depending on the changed opening degree.

The emotion information acquisition unit 30f estimates an emotion of the user and acquires emotion information on the basis of bio-information detected by a bio-sensor 33d which will be described below, an expression of a face detected from a captured image acquired by a visible light camera, content of conversation detected from voice acquired through a microphone. In addition, the emotion information acquisition unit 30f may estimate an emotion on the basis of writing on social media by the user through a predetermined server on a network, content of transmitted/received mail, schedule content of the user and the like.

The projector controller 30g controls image projection from the projector 34 when the communication control device 3 includes the projector 34.

(2-1-2. Communication Unit)

The communication unit 31 transmits/receives data to/from an external device. For example, the communication unit 31 transmits, to the communication control device of the communication destination, captured images photographed by the camera 32b of the telepresence unit 32, sounds collected by the microphone array 32c, the opening degree set by the opening degree setting unit 30c and the like under the control of the telepresence controller 30d. Further, the communication unit 31 receives captured images and sounds acquired in the space of the communication destination from the communication control device of the communication destination.

In addition, the communication unit 31 may transmit, to the communication control device of the communication destination, attribute information of the user stored in the storage unit 37, behavior information and environment information of the user acquired by the various sensors 33, or emotion information acquired by the emotion information acquisition unit 30f under the control of the controller 30. The behavior information is detected by a behavior sensor 33c and the environment information is detected/acquired by a position information acquisition unit 33e, an altitude sensor 33f, an air pollution sensor 33g, a temperature and humidity sensor 33h or a noise sensor 33i.

(2-1-3. Various Sensors)

The various sensors 33 include a plurality of sensors for acquiring environment information of a target space, behavior information, emotion information and the like of a user in the target space. Specifically, the various sensors 33 according to the present embodiment include the depth sensor 33a, a person sensor 33b, the behavior sensor 33c, the bio-sensor 33d, the position information acquisition unit 33e, the altitude sensor 33f, the air pollution sensor 33g, the temperature and humidity sensor 33h and the like. Hereafter, each sensor will be described.

The depth sensor 33a is realized by a sensor array of an infrared camera (e.g., an infrared mask in a random pattern is projected to photograph the pattern) or an infrared sensor that radiates infrared rays and senses reflected light, for example, and acquires depth information of a nearby object. The person sensor 33b analyzes a captured image acquired by a visible light camera, for example, to detect a person in the target space. In addition, the person sensor 33b may additionally use the depth information acquired by the depth sensor 33a to detect a person.

The behavior sensor 33c analyzes a captured image acquired by a visible light camera, for example, to detect a behavior (motion) of a person (person detected by the person sensor 33b) in the target space.

The bio-sensor 33d may receive bio-information such as a heart rate, blood pressure, body temperature, a perspiration amount, a respiration state, an opening degree of pupils and brainwaves from a wearable terminal (a wireless communication terminal such as watch type/band type/head mounted type or sticking type) worn by a user, for example, and detect bio-information of a person in the target space. Bio-information may be received through Wi-Fi (registered trademark), Bluetooth (registered trademark), short-range wireless communication such as infrared communication or near field communication. Furthermore, the bio-sensor 33d may analyze a temperature variation image of the surface of the body of a person, acquired by an infrared camera (thermography) and the like, and detect various bio-information in a non-contact state.

The position information acquisition unit 33e acquires geographical position information (latitude and longitude) of the target space. The altitude sensor 33f acquires altitude information of the target space. The air pollution sensor 33g detects air pollution (dust, exhaust gas and the like) of the target space. The noise sensor 33i analyzes sounds collected by a microphone, for example, and detects noise of the target space.

(2-1-4. Telepresence Unit)

The telepresence unit 32 includes the display part 32a, the camera 32b, the microphone array 32c and the speaker 32d. The display part 32a displays the captured image 321 of the space of the communication destination and the shoji image 322 superimposed depending on the opening degree set by the opening degree setting unit 30c, as illustrated in FIG. 2. In addition, the speaker 32d outputs sounds of the space of the communication destination. Here, the speaker 32d may output the sounds at a volume depending on the opening degree set by the opening degree setting unit 30c. The camera 32b captures an image of the target space (space of the communication source) and the captured image is transmitted to the communication control device of the communication destination. The microphone array 32c collects sounds of the target space, and sound data is transmitted to the communication control device of the communication destination.

(2-1-5. Calendar and Clock Unit)

The calendar and clock unit 35 acquires the current date and time and outputs the acquired date and time information to the controller 30.

(2-1-6. Storage Unit)

The storage unit 37 stores programs of various processes executed by the controller 30 and data used in various processes, for example, the attribute information, object ID and the like of the user.

(2-1-7. Others)

The configuration of the communication control device 3 according to the present embodiment has been described above. The communication control device 3 may include the projector 34 and a physical shoji unit 36 indicated by dotted lines in FIG. 3.

The projector 34 has a function of projecting images under the control of the projector controller 30g of the controller 30. Utilization of the projector 34 will be described below with reference to FIG. 14.

The physical shoji unit 36 is an example of a means for masking a picture depending on the opening degree set by the opening degree setting unit 30c and includes a shoji driver 36a for driving a physical shoji installed to cover the display part 32a, and an opening degree sensor 36b for detecting an opening degree of the physical shoji. Utilization of the physical shoji unit 36 will be described below with reference to FIG. 15.

<2-2. Configuration of Emotion Server>

Figure 4:
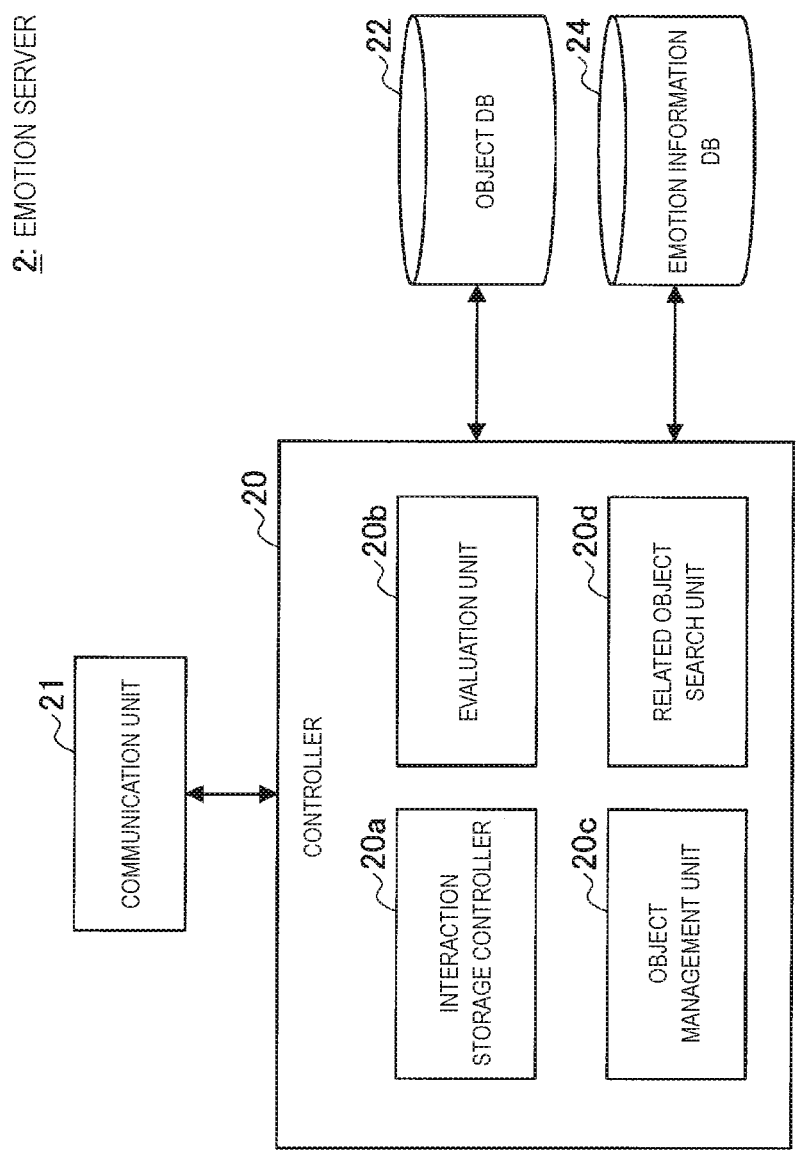
FIG. 4 is a block diagram illustrating an example of a configuration of an emotion server according to the present embodiment.

FIG. 4 is a block diagram illustrating an example of a configuration of the emotion server 2 according to the present embodiment. As illustrated in FIG. 4, the emotion server 2 includes a communication unit 21, a controller 20, an object DB 22 and an emotion information DB 24.

The communication unit 21 is connected to the communication control device 3 through the network and returns interaction evaluation associated with the object ID of the target user designated by the communication control device 3. In addition, the communication unit 21 receives interaction information from a sensing device (not shown) attached to/mounted on each object (person or object).

The controller 20 controls each component of the emotion server 2. Furthermore, the controller 20 is realized by a micro-computer including a CPU, a ROM, a RAM and a nonvolatile memory. In addition, the controller 20 according to the present embodiment serves as an interaction storage controller 20a, an evaluation unit 20b, an object management unit 20c and a related object search unit 20d.

The interaction storage controller 20a controls interaction information received from a sensing device attached to/mounted on an object to be stored in the emotion information DB 24. The sensing device is realized by a humidity sensor, a temperature sensor, a vibration sensor, an infrared sensor, a camera, a tactile sensor, a gyro sensor or the like and senses an interaction of an object with another object.

The evaluation unit 20b evaluates interactions stored in the emotion information DB 24. Although an interaction evaluation method is not particularly limited, the evaluation unit 20b evaluates an interaction applied to an object as higher when the interaction is more desirable for the object, for example, and specifically assigns a score in the range of −1.0 to 1.0 thereto. The evaluation result is correlated with the interaction and stored in the emotion information DB 24.

The object management unit 20c performs management such as registration, change and deletion of information about objects stored in the object DB 22.

The related object search unit 20d searches the object DB 22 and the emotion information DB 24 for an object for which an interaction is generated with respect to a requested object ID as a related object.

The object DB 22 is a storage unit that stores an object ID of each object. In addition, the object DB 22 stores various types of information about objects, such as product names, product types, maker IDs, model numbers, and manufacturing date and time, in addition to object IDs.

The emotion information DB 24 is a storage unit that stores an interaction between objects and evaluation of the interaction.

The specific configuration of the emotion server 2 according to the present embodiment has been described.

3. OPERATION PROCESSES

Next, operation processes of the telepresence system 1 according to the present embodiment will be described in detail.

<3-1. Telepresence Control>

Figure 5:
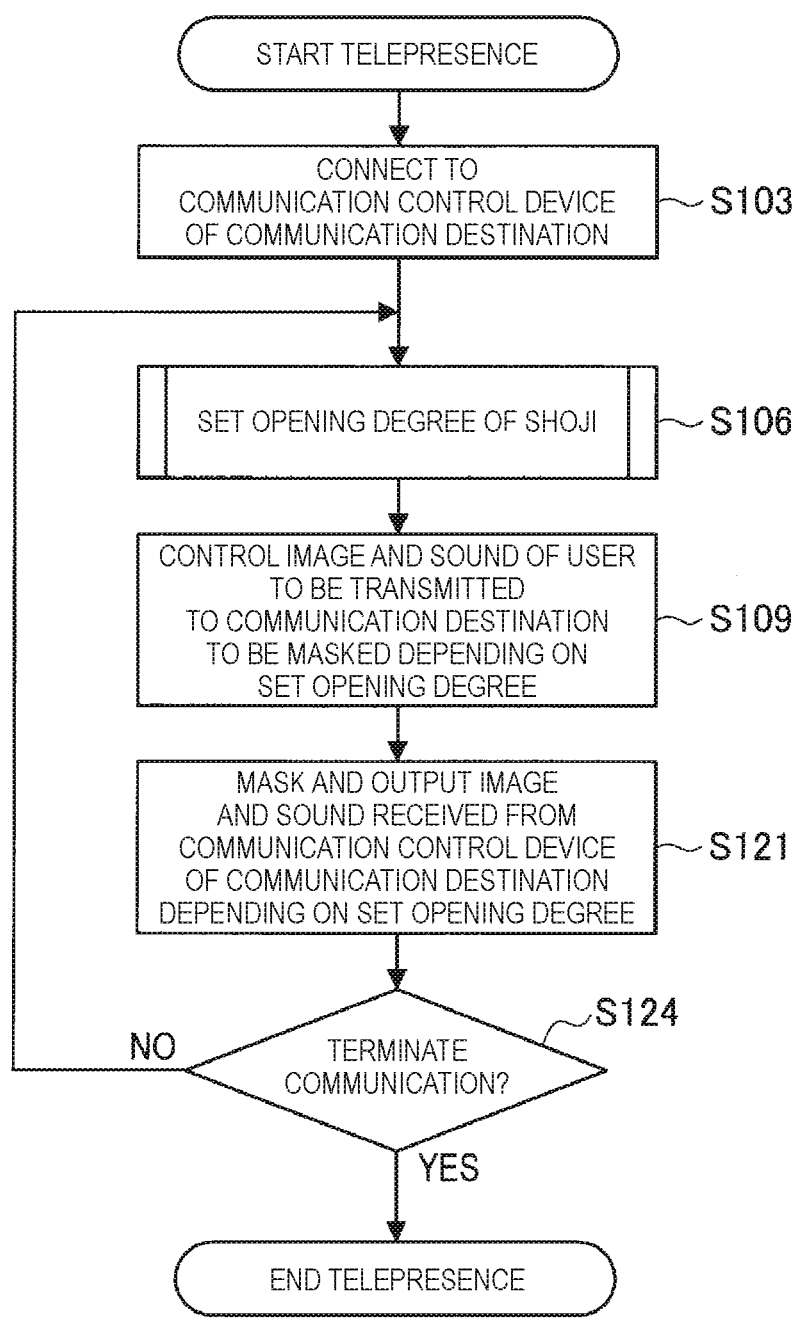
FIG. 5 is a flowchart illustrating a telepresence control process according to the present embodiment.

FIG. 5 is a flowchart illustrating a telepresence control process according to the present embodiment. As illustrated in FIG. 5, first of all, the telepresence controller 30d of the communication control device 3 of a communication source performs a process of connecting to the telepresence controller of the communication control device of a communication destination in step S103.

Then, the opening degree setting unit 30c of the communication control device 3 sets an opening degree of a shoji in step S106. Details of control of setting of the opening degree will be described below with reference to FIG. 6.

Subsequently, the telepresence controller 30d acquires a captured image (picture) and sounds of a user to be transmitted to the communication destination through the camera 32b and the microphone array 32c and controls the acquired captured images and sounds to be masked depending on the set opening degree in step S109. Specifically, the telepresence controller 30d may perform processing of superimposing a shoji image on the captured image depending on the set opening degree and transmit the processed image to the communication destination or transmit the set opening degree with the captured image to the communication destination, for example. Accordingly, it is possible to appropriately control privacy of the user by adjusting an open area of the captured image of the communication source depending on the opening degree of the virtual shoji without showing the whole of a captured image of the communication source.

Thereafter, the telepresence controller 30d controls an image and sounds received from the communication controller of the communication destination to be output in a state in which the image and sounds are masked depending on the set opening degree through the display part 32a and the speaker 32d in step S121. As a means for masking depending on the set opening degree, superimposing the shoji image 322 on the image (captured image 321) received from the communication control device of the communication destination is realized, for example, as illustrated in FIG. 2. Accordingly, the user of the communication source can intuitively recognize the currently set opening degree of the virtual shoji by sharing the privacy level of the communication source with the communication destination and arbitrarily adjust the opening degree through a gesture of opening/closing the shoji when he or she wants to change the opening degree.

Then, the telepresence controller 30d terminates communication with the communication destination when communication termination is ordered ("Yes" in S124) in step S124.

<3-2. Control of Setting of Opening Degree>

Next, setting of the opening degree of the shoji illustrated in step S106 of FIG. 5 will be described in detail.

(3-2-1. Setting of Opening Degree)

Figure 6:
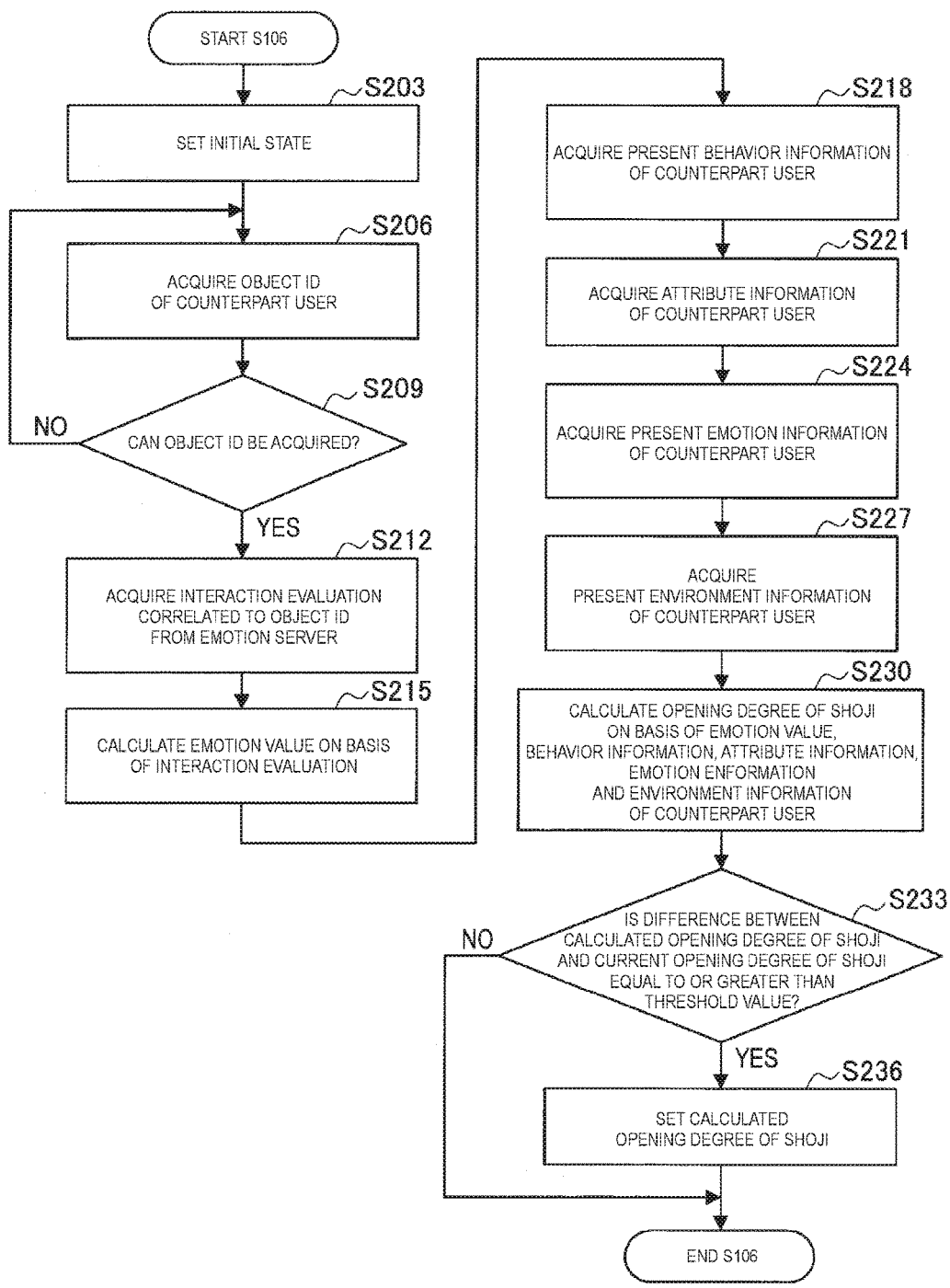
FIG. 6 is a flowchart illustrating an opening degree setting operation process according to the present embodiment.

FIG. 6 is a flowchart illustrating an operation process of setting the opening degree according to the present embodiment. As illustrated in FIG. 6, first of all, the opening degree setting unit 30c of the communication control device 3 sets the opening degree of the shoji to a previously registered initial state in step S203.

Then, the emotion value calculation unit 30b acquires an object ID of a counterpart user in step S206. The object ID of the counterpart user can be acquired from the communication control device of the communication destination through the counterpart user information acquisition unit 30a.

Subsequently, the emotion value calculation unit 30b acquires interaction evaluation correlated to the object ID of the counterpart user from the emotion server 2 in step S212 when the object ID of the counterpart user can be acquired ("Yes" in S209).

Thereafter, the emotion value calculation unit 30b calculates an emotion value on the basis of the acquired interaction evaluation in step S215. Here, calculation of interaction evaluation acquired from the emotion server 2 and the emotion value are described in detail with reference to FIGS. 7 and 8.

FIG. 7 is an illustration of an example of interaction evaluation data according to the present embodiment. The example of data shown in FIG. 7 is interaction evaluation acquired by the emotion value calculation unit 30b from the emotion server 2 and correlated to the object ID of the assigned counterpart user (here, the user B). The emotion server 2 assigned the object ID by the emotion value calculation unit 30b searches for other objects having interactions with the assigned object ID as related objects through the related object search unit 20d. Then, the emotion server 2 transmits interaction evaluations between the corresponding related object IDs and the assigned object ID to the communication control device 3 of a request source.

For example, in the first line of the data example shown in FIG. 7, evaluation of 0.8 is given to an interaction of "enthusiastically watching" performed by the counterpart user (user B) having an object ID: 5505 for a TV (object ID: 15850002) from 19:00 to 21:32 on 2, October, 2010. In the second line of the data example shown in FIG. 7, evaluation of 0.1 is given to an interaction of "being watched with channels frequently changing" of the TV (object ID: 15850002) searched for as a related object, performed by the user B from 19:00 to 21:32 on 2, October, 2010. In this way, an interaction performed by an object at one side for an object at the other side may be sensed by the objects at both sides.

Subsequently, the emotion value calculation unit 30b extracts only interaction evaluation of the counterpart user (here, the user B having object ID: 5505) for other objects (related objects) from accumulation data of past interaction evaluation illustrated in FIG. 7 and calculates emotion values. FIG. 8 is an illustration of an example of data used for emotion value calculation and extracted from the example of interaction evaluation data shown in FIG. 7, as described above. Specifically, evaluation of 0.1 of the interaction of "being watched" from the user B with respect to the TV (object ID: 15850002), evaluation of −0.8 of an interaction "an object is being thrown" from the user B (object ID: 5505) with respect to the TV, and evaluation of −0.5 of an interaction of "making a phone call" of the user B with respect to a telephone (object ID: 17830003) are extracted.

Meanwhile, such interaction is sensed through a sensing device attached to/mounted on objects and surroundings of objects, as described above. For example, when the fact that the user B continuously watches the direction in which the TV is located is detected from a result of analysis of captured images of camera sensors attached to the TV and the room and when the fact that the TV operates and outputs pictures in a time period in which the user B is located in the room is detected from a TV operation history, interactions of "the user B is watching the TV"/"the TV is being watched by the user B" are sensed. In addition, when a motion of throwing an object by the user B or separation and movement of the object from a hand of the user B is detected from a result of analysis of captured images of camera sensors attached to the TV and the room and when hitting the case body of the TV by the object is sensed from a vibration sensor attached to the TV, interactions of "throwing the object at the TV"/"being thrown" are sensed.

Further, when a situation in which the user B holds the receiver of the telephone with a hand is detected from a result of analysis of captured images of camera sensors attached to the telephone and the room and when the fact that the user B made a phone call is detected from a telephone operation history, an interaction of making a phone call is sensed. Furthermore, when the fact that impact was applied to the telephone is detected by a vibration sensor attached to the telephone and when a sound of pulling a cord is detected by a microphone provided in the telephone, an interaction of making a phone call while pulling the cord is sensed.

Next, an example of calculation of an emotion value Q1 of the user B by the emotion value calculation unit 30b will be described. The emotion value Q1 is calculated according to the following formula 1, for example.

$$Q1 = \frac{\sum_{n}^{All\ interaction\ types}\left(a_n \times \sum Q_n\right)}{Total\ number\ of\ interactions} \quad \text{(Formula 1)}$$

Here, $a_n$: coefficient for interaction type n, $-1 \leq a_n \leq 1$ $\Sigma Q_n$: Sum of evaluations of interaction type n The above formula 1 represents that the emotion value Q1 is calculated by multiplying the sum of evaluation values for each interaction type by a coefficient depending on interaction type and dividing the total sum of all interaction types by the total number of interactions. Here, application of interaction evaluation shown in FIG. 8 to the above formula 1 is represented in the following formula 2.

$$Q1 = \frac{a_{watched} \times (0.1) + a_{thrown} \times (-0.8) + a_{make\ a\ phone\ call} \times (-0.5)}{3} \quad \text{(Formula 2)}$$

In this way, the emotion value calculation unit 30b can obtain the emotion value Q1 of the user B as represented by the above formula 2.

The calculated emotion value of the counterpart user represents trust of the counterpart user. Although a user is relieved even when privacy is lower when a communication counterpart is trusted in the telepresence system, it is possible to appropriately maintain privacy of the user by increasing the privacy when the counterpart is not trusted. Accordingly, utilization of the emotion value representing trust of the counterpart user is effective.

Referring back to FIG. 6, the counterpart user information acquisition unit 30a acquires present behavior information of the counterpart user in step S218. The present behavior information of the counterpart user may be received from the communication control device of the communication destination. The communication control device of the communication destination has the same configuration as the communication control device 3 illustrated in FIG. 3, and a behavior of the user B in the target space is detected by the behavior sensor 33c included in the various sensors 33. The behavior sensor 33c of the communication destination analyzes captured images acquired by a visible light camera, for example, to detect a behavior of the user B intensively focusing on drawing up a document through fast typing using a PC.

Then, the counterpart user information acquisition unit 30a acquires attribute information of the counterpart user in step S221. The attribute information of the counterpart user may be received from the communication control device of the communication destination. The communication control device of the communication destination has the same configuration as the communication control device 3 illustrated in FIG. 3, and the attribute information of the user B in the target space is stored, for example, in the storage unit 37. For example, attribute information indicating that the counterpart user has a cheerful disposition is stored.

Subsequently, the counterpart user information acquisition unit 30a acquires present emotion information of the counterpart user in step S224. The present emotion information of the counterpart user may be received from the communication control device of the communication destination. The communication control device of the communication destination has the same configuration as the communication control device 3 illustrated in FIG. 3, and emotion information of the user B in the target space is detected by the emotion information acquisition unit 30f. For example, a counterpart user's emotion of being angry and getting excited is detected.

Thereafter, the counterpart user information acquisition unit 30a acquires present environment information of the counterpart user in step S227. The present environment information of the counterpart user may be received from the communication control device of the communication destination. The communication control device of the communication destination has the same configuration as the communication control device 3 illustrated in FIG. 3, and the environment of the target space is detected by the air pollution sensor 33g, the temperature and humidity sensor 33h, the noise sensor 33i or the like included among the various sensors 33. For example, construction noise or the like in the target space is detected.

Then, the opening degree setting unit 30c calculates the opening degree of the shoji on the basis of the emotion value, behavior information, attribute information, emotion information and environment information of the counterpart user in step S230. Here, when higher evaluations in the range of −1.0 to 1.0 are assigned to the behavior information, attribute information, emotion information and environment information as the information is more suitable for a situation in which telepresence is performed, a parameter Q2 for setting the opening degree of the shoji can be calculated as follows.

$$Q2 = \frac{b_1 \times (\text{Total sum of behavior evaluations}) + b_2 \times (\text{Total sum of attribute evaluations}) + b_3 \times (\text{Total sum of emotion evaluations}) + b_4 \times (\text{Total sum of environment evaluations})}{\text{Total sum of evaluations}} \quad \text{(Formula 3)}$$

Here, $b_n$: coefficient, $-1 \leq b_n \leq 1$

For example, when an evaluation value (behavior evaluation) of present behavior information of the user B who is intensively focusing on drawing up a document is −0.2, an evaluation value (attribute evaluation) of attribute information indicating a cheerful personality is 0.5, an evaluation value (emotion evaluation) of present emotion information representing anger and excitation is −0.5 and an evaluation value (environment evaluation) of environment information such as construction noise is −0.2, the parameter Q2 is calculated as follows.

$$Q2 = \frac{b_1 \times (-0.2) + b_2 \times (0.5) + b_3 \times (-0.5) + b_4 \times (-0.2)}{4} \quad \text{(Formula 4)}$$

Then, the opening degree setting unit 30c calculates a final opening degree Q as follows.

$$Q = \frac{r_1 \times (Q1) + r_2 \times (Q2)}{2} \quad \text{(Formula 5)}$$

Here, $r_1, r_2$: coefficients, $-1 \leq r_1, r_2 \leq 1$

Subsequently, the opening degree setting unit 30c determines whether a difference between the calculated opening degree of the shoji and the current opening degree of the shoji is equal to or greater than a threshold value in step S233.

Then, the opening degree setting unit 30c sets the opening degree of the shoji to the calculated opening degree and outputs the set opening degree to the telepresence controller 30d in step S236 when the difference is equal to or greater than the threshold value ("Yes" in S233).

The opening degree setting process according to the present embodiment has been described in detail above. Although the opening degree of the shoji is set on the basis of all of the emotion value, behavior information, attribute information, emotion information and environment information of the counterpart user in the aforementioned opening degree setting process, the present embodiment is not limited thereto. For example, the opening degree setting unit 30c may set the opening degree of the shoji on the basis of at least one of the emotion value, behavior information, attribute information, emotion information and environment information.

In addition, the telepresence system according to the present embodiment may set the privacy level (opening degree of the virtual shoji) depending on the user of the communication source. Specifically, the opening degree setting unit 30c sets the privacy level depending on a relative emotion value calculated on the basis of interaction evaluation between the counterpart user of the communication destination and the user of the communication source.

(3-2-2. Change of Opening Degree)

Next, change of the opening degree of the shoji by a gesture will be described with reference to FIGS. 9 and 10. While the opening degree of the shoji is automatically set depending on the counterpart user to appropriately maintain privacy of the user in the aforementioned embodiment, the user may arbitrarily change the opening degree of the shoji by a gesture when he or she wants to change the opening degree of the shoji.

Figure 9:
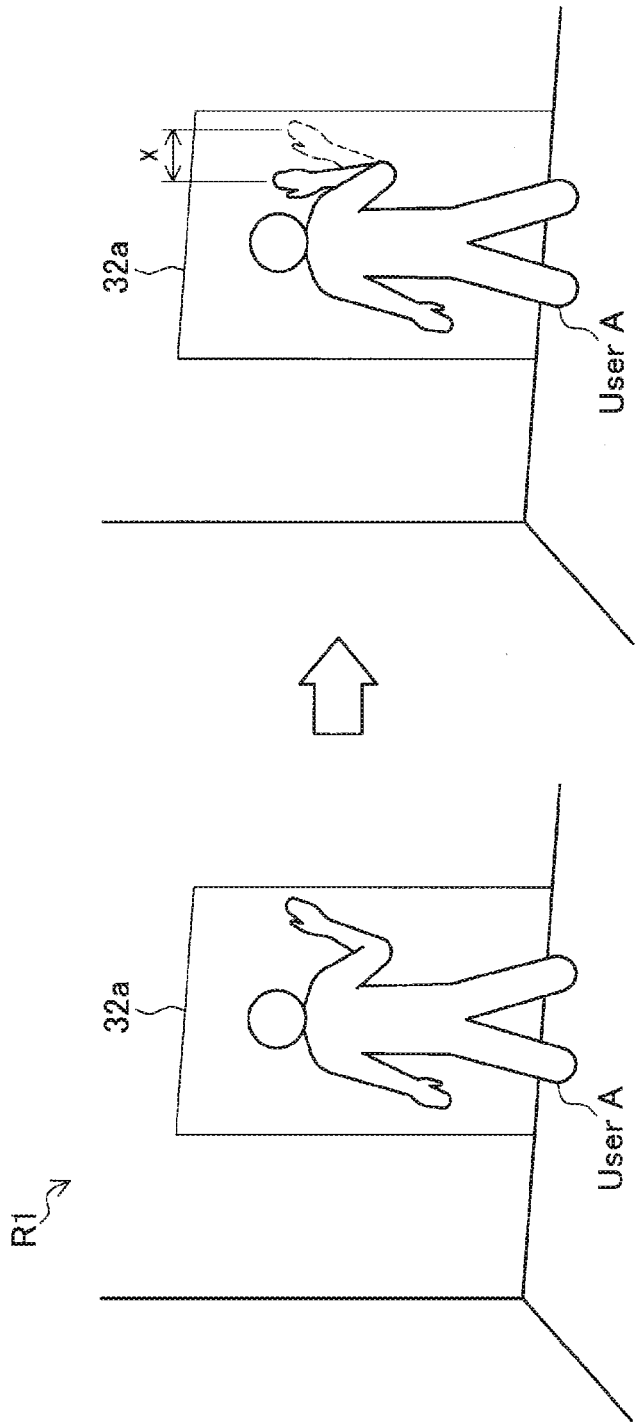
FIG. 9 is an explanatory diagram of shoji opening and closing gestures according to the present embodiment.

FIG. 9 is an explanatory diagram of gestures of opening and closing the shoji according to the present embodiment. As illustrated in FIG. 9, when the user horizontally moves a hand with respect to the display part 32a, the motion of the hand is detected by the depth sensor 33a of the communication control device 3. The gesture detection unit 30e of the communication control device 3 acquires a horizontal moving distance x of the hand near the display part 32a on the basis of depth information acquired by the depth sensor 33a. Here, the gesture detection unit 30e acquires the distance x when the user moves the hand to the right with respect to the display part 32a as a positive numerical value and acquires the distance x when the user moves the hand with respect to the left for the display part 32a as a negative numerical value.

Figure 10:
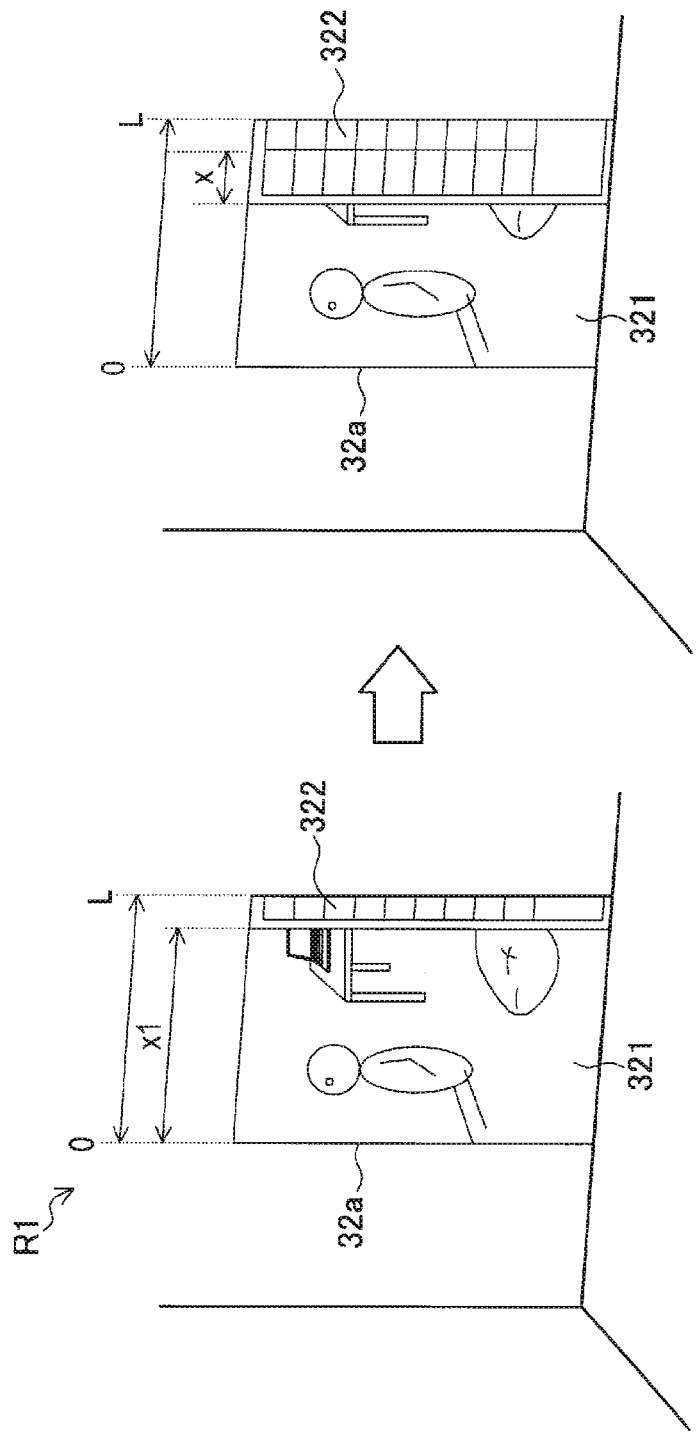
FIG. 10 is an explanatory diagram of change of display of a shoji image depending on opening and closing gestures according to the present embodiment.

FIG. 10 is an explanatory diagram of change of display of the shoji image 322 depending on opening and closing gestures. As illustrated in FIG. 10, the shoji image 322 is superimposed on the captured image 321 of the room R2 of the counterpart user B on the display part 32a of the room R1. As shown on the left in FIG. 10, in the horizontal length L of the display part 32a, the current opening degree of the shoji image 322 (i.e., horizontal length of an area in which the captured image 321 corresponding to the scene of the other side is seen) is set to x1.

In addition, the telepresence controller 30d changes the shoji image 322 to have an opening degree set by the opening degree setting unit 30c depending on a gesture detected by the gesture detection unit 30e. Specifically, the telepresence controller 30d controls the opening degree of the shoji to be x1+x. Further, the telepresence controller 30d transmits the opening degree set depending on the gesture to the communication control device of the communication destination to share the opening degree.

Additionally, the telepresence controller 30d may change a display mode of the shoji image 322 depending on the opening degree of the shoji image 322 and a gesture. This will be described below with reference to FIG. 11.

Figure 11:
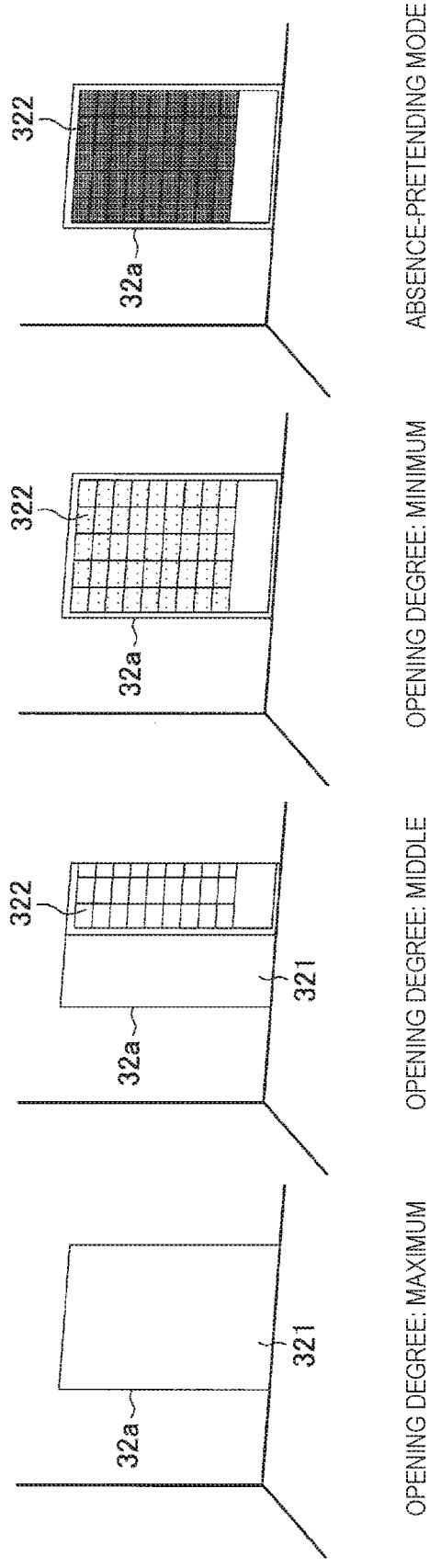
FIG. 11 is an explanatory diagram of change of display modes of a shoji image according to the present embodiment.

FIG. 11 is an explanatory diagram of change of the display mode of the shoji image 322 according to the present embodiment. FIG. 11 illustrates an example in which the opening degree of the shoji image 322 decreases in stages from a maximum state (x1=L) to a minimum state (x1=0). When the opening degree of the shoji image 322 is a maximum level (x1=L), as shown on the left in FIG. 11, the captured image 321 of the communication destination is displayed in the overall surface of the display part 32a. When the opening degree of the shoji image 322 is a middle level, the area of the shoji image 322 displayed on the display part 32a extends and the area of the captured image 321 of the communication destination decreases.

In addition, when the opening degree is a minimum level (x1=0), the shoji image 322 is displayed in the overall surface of the display part 32a, as illustrated in FIG. 11. Here, the telepresence controller 30 displays the shoji image 322 seen as if light were turned on in the space (the room R2 of the communication destination) beyond the shoji. Accordingly, even when the situation of the communication destination is not seen because the shoji image 322 is closed, the function of the actual shoji to deliver presence of a person or an object in the space beyond the shoji can be realized.

Here, when the user makes a gesture of further closing the shoji, the telepresence controller 30d switches the display mode to an absence-pretending mode and displays a shoji image 322M seen as if light were turned off in the space (the room R2 of the communication destination) beyond the shoji, as shown on the right in FIG. 11. The absence-pretending mode is shared with the communication destination and thus a shoji image having a minimum opening degree (x1=0) and seen as if light of the room R1 of the communication destination were turned off is displayed on the display part 23a-2 in the room R2 in a similar manner. Accordingly, when the shoji image is displayed in front of the display part with a minimum opening degree of the shoji and the situation of the room of the communication destination is not seen, the shoji image can be seen as if nobody were there (absent) at the opposite side by switching the display mode to the absence-pretending mode.

Figure 12:
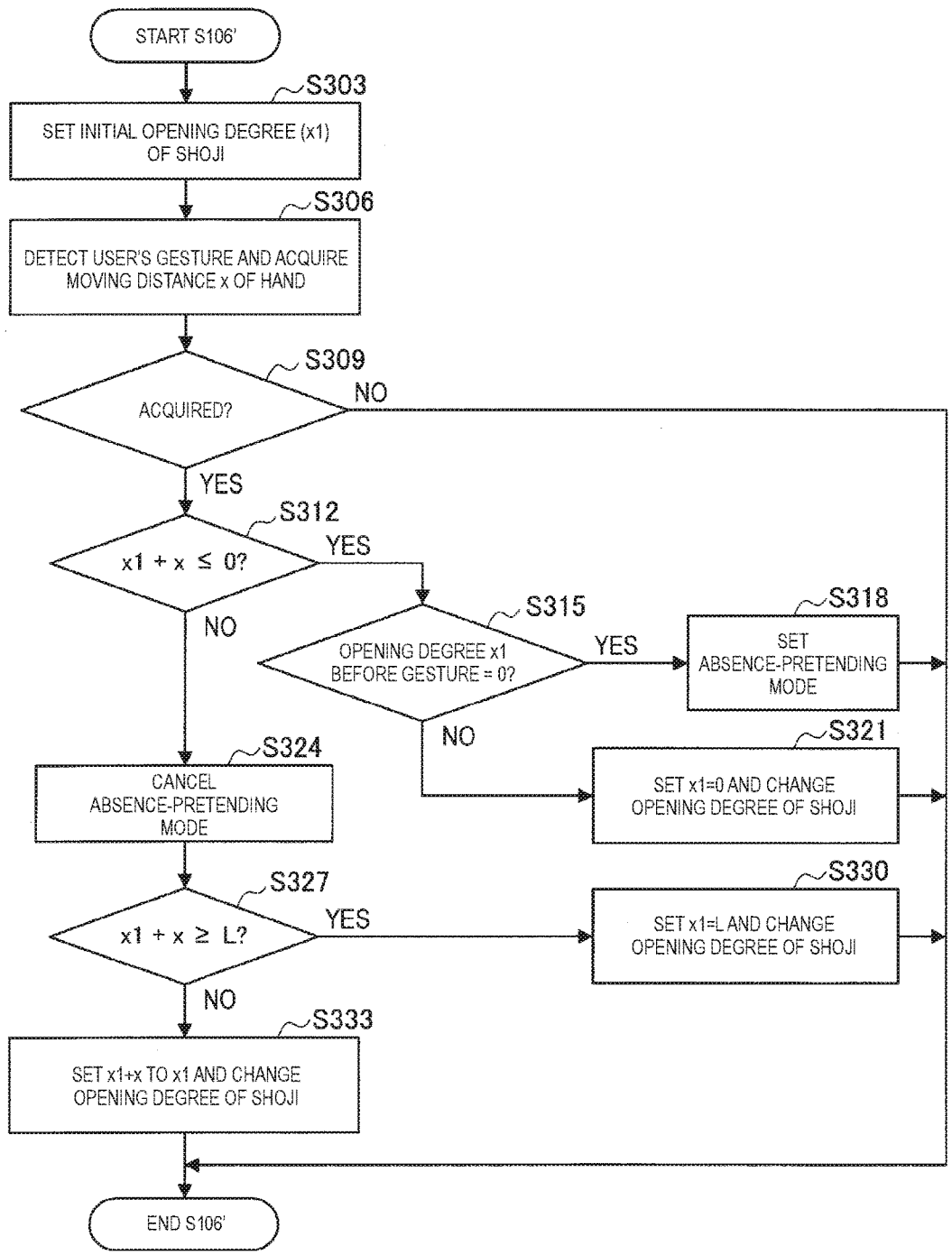
FIG. 12 is a flowchart illustrating an opening degree setting operation process depending on a gesture according to the present embodiment.

The aforementioned operation process of changing the opening degree depending on a gesture will be described with reference to FIG. 12. FIG. 12 is a flowchart illustrating the operation process of changing the opening degree depending on a gesture according to the present embodiment.

As illustrated in FIG. 12, first of all, the opening degree setting unit 30c of the communication control device 3 sets an initial opening degree (x1) of the shoji in step S303.

Then, the gesture detection unit 30e detects a gesture of the user on the basis of depth information sensed by the depth sensor 33a and acquires a horizontal moving distance x of a hand (refer to FIG. 9) in step S306. As described above, the gesture detection unit 30e acquires the distance x when the user moves the hand to the right with respect to the display part 32a as a positive numerical value and acquires the distance x when the user moves the hand to the left with respect to the display part 32a as a negative numerical value. In addition, the maximum horizontal length of the display part 32a is set to L (refer to FIG. 10).

Subsequently, when the moving distance x of the user's hand can be acquired by the gesture detection unit 30e ("Yes" in step S309), the opening degree setting unit 30c determines whether x1+x is equal to or lower than 0 in step S312.

If x1+x is equal to or lower than 0 ("Yes" in S312), the opening degree setting unit 30c determines whether the opening degree x1 before the gesture was 0 in step S315. When the maximum horizontal length of the display part 32a is L as illustrated in FIG. 10, opening degree x1=0 means a state in which the shoji is completely closed.

If the opening degree x1 before the gesture was 0 ("Yes" in S315), the opening degree setting unit 30c determines that the display mode is the absence-pretending mode and outputs information indicating that the absence-pretending mode has been set to the telepresence controller 30d. That is, if the user makes a gesture of further closing the shoji in a state in which the shoji is completely closed (opening degree x1=0), a negative numerical value x is acquired and x1+x becomes lower than 0. In this case, the opening degree setting unit 30c determines that the display mode is the absence-pretending mode and sets the absence-pretending mode.

On the other hand, if the opening degree x1 before the gesture is not 0 ("No" in S315), the opening degree setting unit 30c sets x1=0 and instructs the telepresence controller 30d to change the opening degree of the shoji. That is, when x1+x is lower than 0, the opening degree setting unit 30c sets the opening degree to the minimum level (x1=0).

If x1+x is not equal to or lower than 0 ("No" in S312), the opening degree setting unit 30c cancels the absence-pretending mode in step S324.

Then, it is determined whether x1+x is equal to or greater than the maximum horizontal length L (refer to FIG. 10) of the display part 32a in step S327.

If x1+x is equal to or greater than L ("Yes" in S327), the opening degree setting unit 30c sets x1=L and instructs the telepresence controller 30d to change the opening degree of the shoji in step S330. That is, when x1+x is equal to or greater than L, the opening degree setting unit 30c sets the opening degree to the maximum level (x1=L).

On the other hand, if x1+x is not equal to or greater than L ("No in S327), the opening degree setting unit 30c sets x1+x to x1 and instructs the telepresence controller 30d to change the opening degree of the shoji in step S333. That is, when x1+x is below L, the opening degree setting unit 30c sets the opening degree x1+x depending on the gesture.

Setting of the opening degree of the virtual shoji depending on a gesture according to the present embodiment has been described above.

4. SUPPLEMENT

Next, a supplementary description of the telepresence system 1 according to the present embodiment will be given.
<4-1. Display of Message and the Like>

In the telepresence system according to the present embodiment, it is possible to send a message and the like to a counterpart even in a state in which high privacy with respect to a communication destination is maintained. This will be described below with reference to FIGS. 13 and 14.

Figure 13:
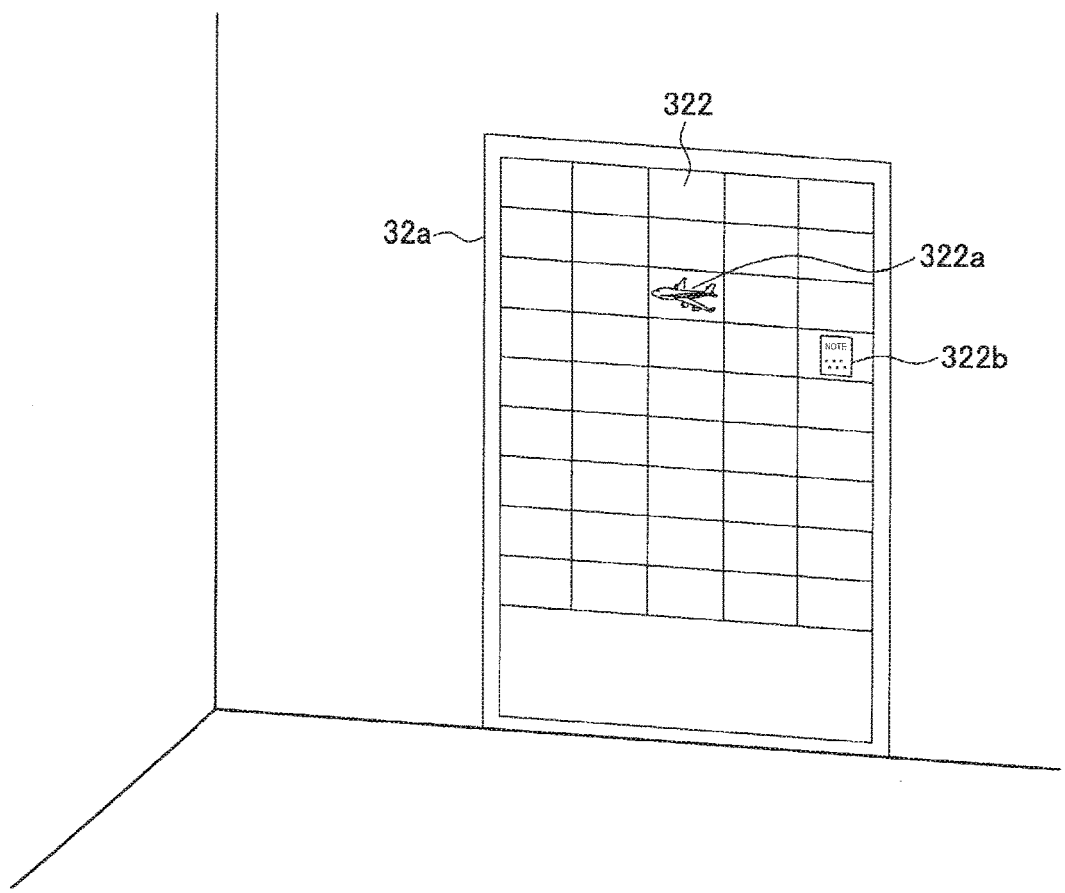
FIG. 13 is an explanatory diagram of an example of message display according to the present embodiment.

FIG. 13 is an explanatory diagram of an example of message display according to the present embodiment. The telepresence controller 30d of the communication control device 3 can notify of a message from the communication destination by displaying an icon on the shoji image 322 displayed on the display part 32a to maintain privacy, as illustrated in FIG. 13. For example, an airplane icon 322a indicating that the user is on a trip and a note icon 322b indicating that there is message text are displayed. The telepresence controller 30d may control message text content corresponding to the note icon 322b to be magnified and displayed depending on a user's gesture detected by the gesture detection unit 30e.

In addition, the telepresence controller 30d may deliver the ambience of the communication destination by changing the colors of the whole of the shoji image 322 in addition to the aforementioned message. For example, the telepresence controller 30d may change colors of the whole of the shoji image 322 depending on environment information and emotion information of the communication destination acquired by the counterpart user information acquisition unit 30a.

Figure 14:
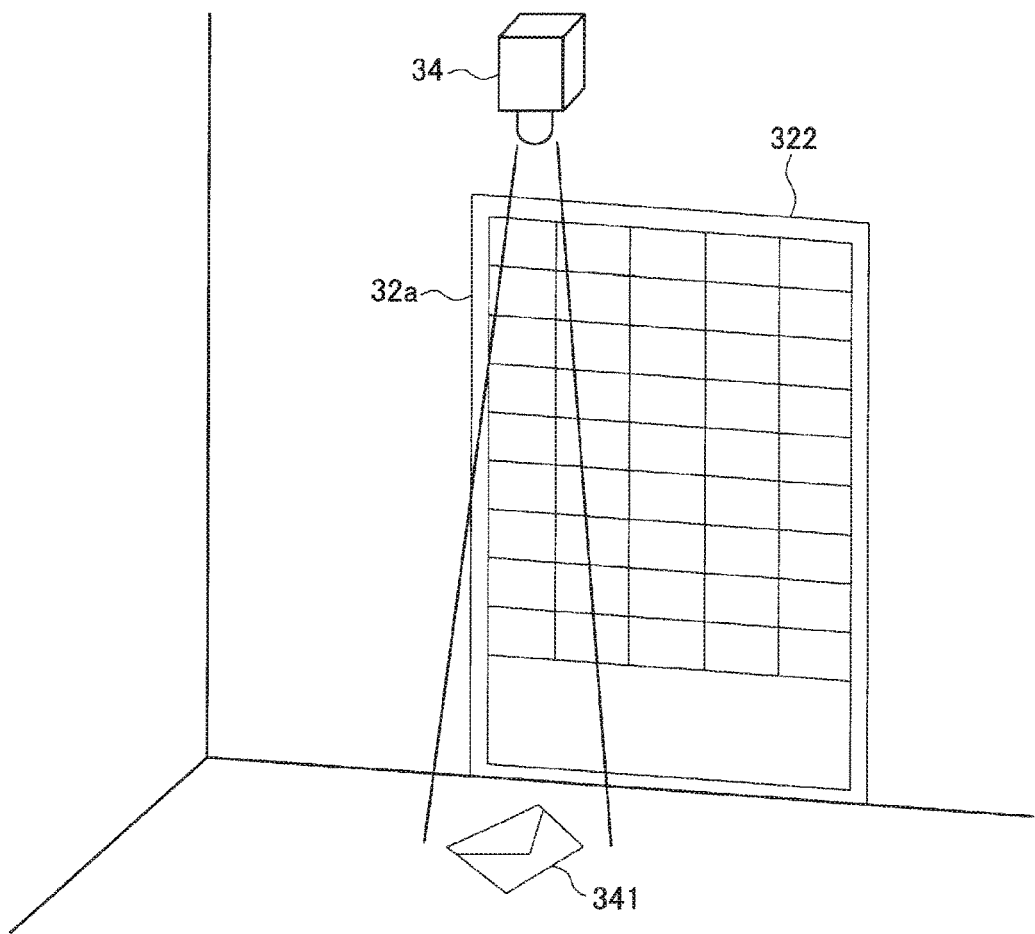
FIG. 14 is an explanatory diagram of another example of message display according to the present embodiment.

Furthermore, notification of a message and the like is not limited to use of the shoji image 322 described above and may be displayed on the floor near the display part 32a using the projector, for example. FIG. 14 is an explanatory diagram of another example of message display according to the present embodiment. As illustrated in FIG. 14, when the projector 34 is installed in the room R1, for example, the projector controller 30g of the communication control device 3 can notify the user of a message by projecting an icon on the floor near the display part 32a using the projector 34. In FIG. 14, a mail icon 341 is projected as an example. The telepresence controller 30d may control content corresponding to the mail icon 341 to be magnified and displayed on the shoji image 322 of the display part 32a depending on a user's gesture detected by the gesture detection unit 30e.
<4-2. Use of Physical Shoji>

Although the shoji image 322 (virtual shoji) is used as a means for appropriately maintaining privacy with respect to the communication destination in the embodiment described above, the telepresence system according to the present disclosure is not limited thereto, and it is possible to maintain privacy with respect to the communication destination by installing an actual physical shoji in front of the display part 32a and controlling the opening degree of the physical shoji. This will be described in detail below with reference to FIG. 15.

Figure 15:
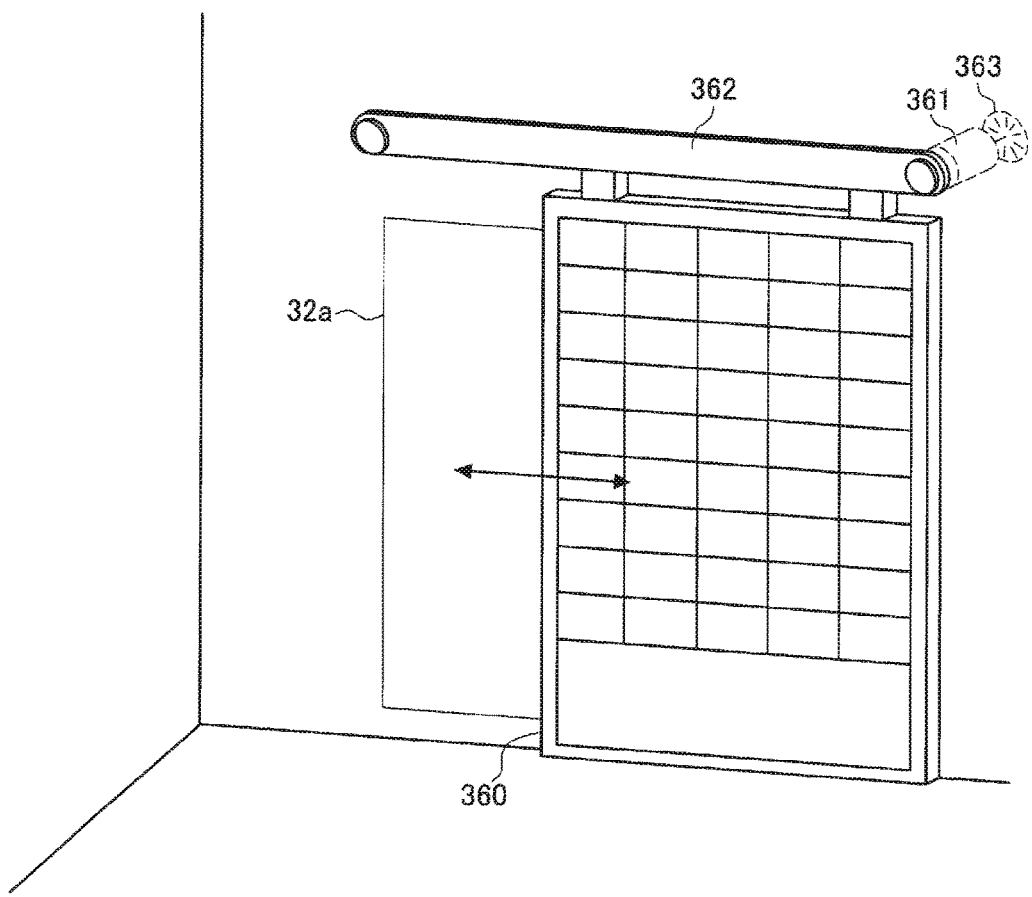
FIG. 15 is an explanatory diagram of privacy control using a physical shoji according to the present embodiment.

FIG. 15 is an explanatory diagram of privacy control using a physical shoji according to the present embodiment. As illustrated in FIG. 15, a physical shoji 360 arranged to cover the display part 32a, a belt 362 for moving the shoji 360, a motor 361 for driving the belt 362 and a rotary encoder 363 corresponding to an example of the opening degree sensor 36b are provided. The upper side of the shoji 360 is attached to the belt 362 such that the shoji 360 moves with the belt 362 in the horizontal direction.

The shoji driver 36a (refer to FIG. 3) of the communication control device 3 moves the shoji 360 to have a set opening degree according to control of the telepresence controller 30d. Specifically, the shoji driver 36a can move the shoji 360 in the horizontal direction by driving the motor 361 to move the belt 362 to thereby adjust the opening degree. In addition, the opening degree of the shoji 360 is detected by the rotary encoder 363.

While FIG. 15 shows the actual shoji as an example of physically covering the display part 32a, the present embodiment is not limited thereto, and a curtain, a roll curtain, a misu, a blind, frosted glass, a liquid crystal shutter and the like that can change the transmittance may be provided as actual objects for physically covering the display part 32a.

5. CONCLUSION

As described above, in the telepresence system according to the present disclosure, it is possible to appropriately maintain privacy by setting a privacy level in the telepresence system depending on a counterpart user of a communication destination.

The preferred embodiment(s) of the present disclosure has/have been described above with reference to the accompanying drawings, whilst the present technology is not limited to the above examples. A person skilled in the art may find various alterations and modifications within the scope of the appended claims, and it should be understood that they will naturally come under the technical scope of the present disclosure.

Further, a computer program for exerting a function of the communication control device 3 can be prepared in hardware such as the CPU, the ROM, and the RAM included in the above communication control device 3. Further, a computer readable storage medium in which the computer program is stored is also provided.

In addition, although the communication control devices 3 for controlling spaces connected through telepresence are explained as systems connected through a network in the aforementioned embodiment, the telepresence system according to the present disclosure is not limited thereto and communication of the spaces may be controlled by a single server, for example. In this case, the server has the functional components included in the controller 30 of the communication control device 3 illustrated in FIG. 3. Further, the telepresence unit 32 and the various sensors 33 are provided in each space.

Further, although calculation of an emotion value is performed by the emotion value calculation unit 30b of the communication control device 3 in the telepresence system according to the present embodiment, the present disclosure is not limited thereto and calculation of an emotion value may be performed in the emotion server 2.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a setting unit that automatically sets a privacy level depending on a user of a communication destination device;

a communication unit that transmits a picture of a user of a communication source device to the communication destination device; and a controller that performs control to mask the picture of the user of the communication source device depending on the automatically set privacy level.

(2)

The information processing system according to (1), wherein the controller controls the communication unit to transmit information about the privacy level to the communication destination device.

(3)

The information processing system according to (1) or (2), wherein the controller processes the picture of the user of the communication source device depending on the privacy level and controls the communication unit to transmit the processed picture to the communication destination device.

(4)

The information processing system according to any one of (1) to (3), wherein the setting unit automatically sets the privacy level depending on at least one of a emotion value, emotion information, attribute information, behavior information and environment information of the user of the communication destination device.

(5)

The information processing system according to any one of (1) to (4), wherein the setting unit automatically sets the privacy level depending on the user of the communication source device.

(6)

The information processing system according to (5), wherein the setting unit automatically sets the privacy level depending on a relative emotion value of the user of the communication destination device with respect to the user of the communication source device.

(7)

The information processing system according to any one of (1) to (6), wherein the controller masks the picture of the user by superimposing an image on the picture of the user.

(8)

The information processing system according to (7), wherein the setting unit sets the privacy level as an opening degree when the superimposed image is a shoji image, a curtain image, a roll curtain image, a misu image or a blind image.

(9)

The information processing system according to (7), wherein the setting unit sets the privacy level as a transmittance when the superimposed image is a frosted glass image or a liquid crystal shutter image.

(10)

The information processing system according to any one of (1) to (9), further including:

a gesture detection unit that detects a gesture of the user, wherein the setting unit changes the privacy level depending on the detected gesture.

(11)

The information processing system according to any one of (1) to (10), wherein the controller performs control to mask and display a picture of a counterpart user of the communication destination device received from the communication destination device depending on the privacy level set by the setting unit.

(12)

The information processing system according to any one of (1) to (11), wherein the controller controls the superimposed image to include an icon indicating a situation or a message of a counterpart user of the communication destination device.

(13)

A storage medium having a program stored therein, the program causing a computer to function as:

a setting unit that automatically sets a privacy level depending on a counterpart user of a communication destination device;

a communication unit that transmits a picture of a user to the communication destination device; and a controller that performs control to mask the picture of the user depending on the automatically set privacy level.

(14)

A control method including:

automatically setting a privacy level depending on a user of a communication destination device;

transmitting a picture of a user of a communication source device to the communication destination device; and performing control to mask the picture of the user of the communication source device depending on the automatically set privacy level.

REFERENCE SIGNS LIST 1 telepresence system
2 emotion server
20 controller
20a interaction storage controller
20b evaluation unit
20c object management unit
20d related object search unit
21 communication unit
22 object DB
24 emotion information DB
3 communication control device
30 controller 30a counterpart user information acquisition unit
30b emotion value calculation unit
30c opening degree setting unit
30d telepresence controller
30e gesture detection unit
30f emotion information acquisition unit
30g projector controller
31 communication unit
32 telepresence unit
32a display part
32b camera
32c microphone array
32d speaker
33 various sensors
33a depth sensor
33b person sensor
33c behavior sensor
33d bio-sensor
33e position information acquisition unit
33f altitude sensor
33g air pollution sensor
33h temperature and humidity sensor
33i noise sensor
35 calendar and clock unit
36 physical shoji unit
36a shoji driver
36b opening degree sensor
37 storage unit
321 captured image
322 shoji image
R1, R2 room

The invention claimed is:

1. An information processing system, comprising:
a controller configured to:
acquire a current privacy level as a first privacy level of a first user of a communication source device;
determine a second privacy level of the first user based on a second user of a communication destination device;
calculate a difference between the first privacy level and the second privacy level;
set the second privacy level for the first user based on the difference that is greater than or equal to a threshold value;
control transmission of a first picture of the first user of the communication source device to the communication destination device; and
mask the first picture of the first user of the communication source device based on the set second privacy level.

2. The information processing system according to claim 1, wherein the controller is further configured to control transmission of information about the set second privacy level to the communication destination device.

3. The information processing system according to claim 1, wherein the controller is further configured to:
process the first picture of the first user of the communication source device based on the set second privacy level; and
control transmission of the processed first picture to the communication destination device.

4. The information processing system according to claim 1, wherein the controller is further configured to determine the second privacy level based on at least one of an emotion value, emotion information, attribute information, behavior information, and environment information of the second user of the communication destination device.

5. The information processing system according to claim 1, wherein the controller is further configured to determine the second privacy level based on the first user of the communication source device.

6. The information processing system according to claim 5, wherein
the controller is further configured to determine the second privacy level based on a relative emotion value of the second user of the communication destination device with respect to the first user of the communication source device.

7. The information processing system according to claim 1, wherein the controller is further configured to:
superimpose an image on the first picture of the first user; and
mask the first picture based on the superimposed image.

8. The information processing system according to claim 7, wherein the controller is further configured to set the second privacy level as an opening degree based on the superimposed image that is one of a shoji image, a curtain image, a roll curtain image, a misu image or a blind image.

9. The information processing system according to claim 7, wherein the controller is further configured to set the second privacy level as a transmittance based on the superimposed image that is one of a frosted glass image or a liquid crystal shutter image.

10. The information processing system according to claim 1, wherein the controller is further configured to:
detect a gesture of the first user, and
change the second privacy level based on the detected gesture.

11. The information processing system according to claim 1, wherein the controller is further configured to:
receive a second picture of the second user from the communication destination device;
mask the received second picture based on the set second privacy level; and
display the masked second picture.

12. The information processing system according to claim 7, wherein
the controller is further configured to display an icon on the superimposed image, and
the icon indicates at least one of a situation and a message from the second user of the communication destination device.

13. A non-transitory computer-readable medium having stored thereon computer-executable instructions that, when executed by a computer, cause the computer to execute operations, the operations comprising:
acquiring a current privacy level as a first privacy level of a first user of a communication source device;
determining a second privacy level of the first user based on a second user of a communication destination device;
calculating a difference between the first privacy level and the second privacy level;
setting the second privacy level for the first user based on the difference that is greater than or equal to a threshold value;
transmitting a picture of the first user to the communication destination device; and
masking the picture of the first user based on the set second privacy level.

14. A control method, comprising:
acquiring a current privacy level as a first privacy level of a first user of a communication source device;

determining a second privacy level of the first user based on a second user of a communication destination device;
calculating a difference between the first privacy level and the second privacy level;
setting the second privacy level for the first user of the communication source device based on the difference that is greater than or equal to a threshold value;
transmitting a picture of the first user of the communication source device to the communication destination device; and
masking the picture of the first user of the communication source device based on the set second privacy level.

* * * * *